Oct. 24, 1967  R. K. SEDGWICK  3,348,298
MECHANICAL TOOL CHANGER FOR A MACHINE TOOL
Filed Aug. 10, 1961  8 Sheets-Sheet 1

INVENTOR.
ROBERT K. SEDGWICK
BY
Cyril M. Hajewski
ATTORNEY

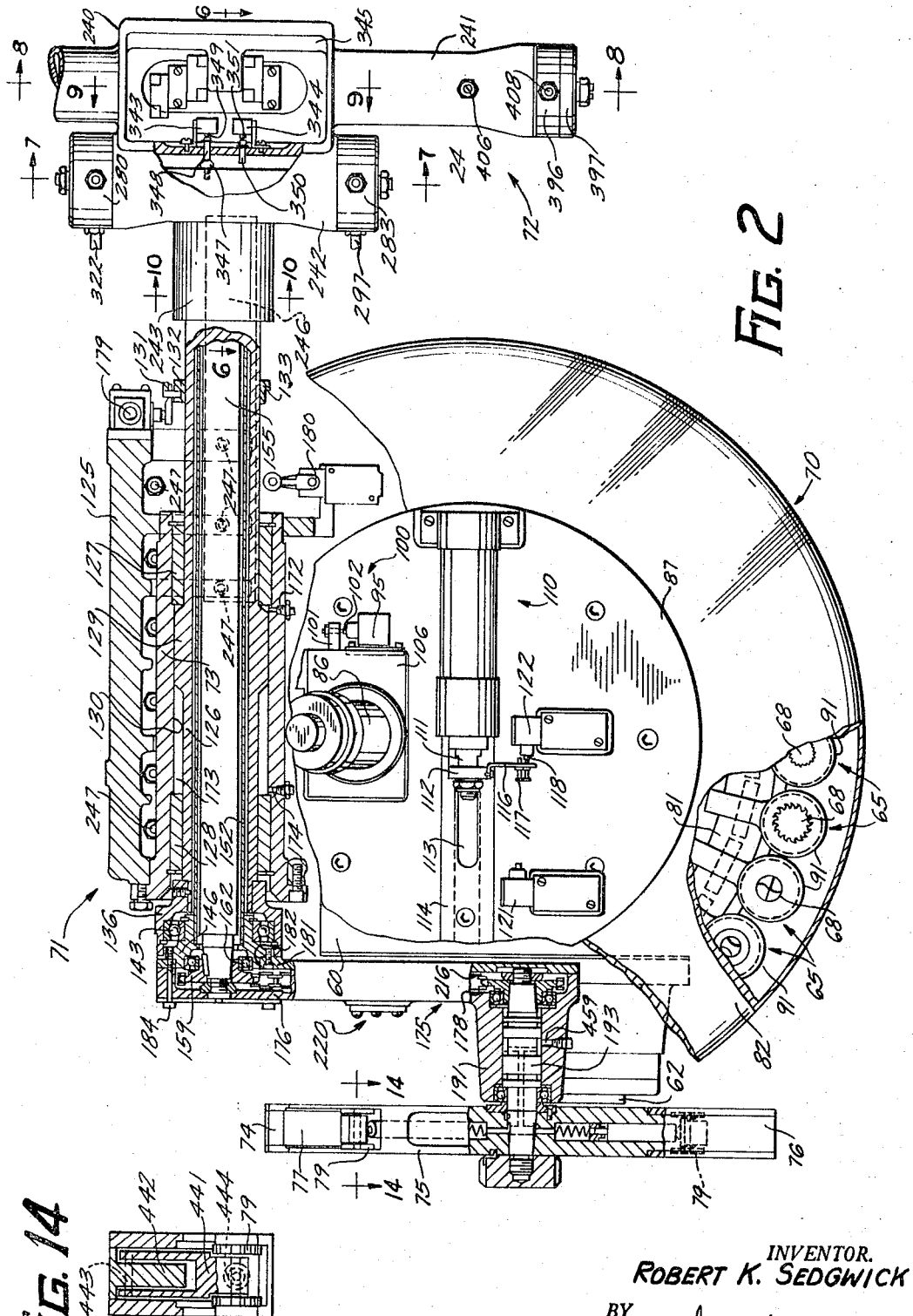

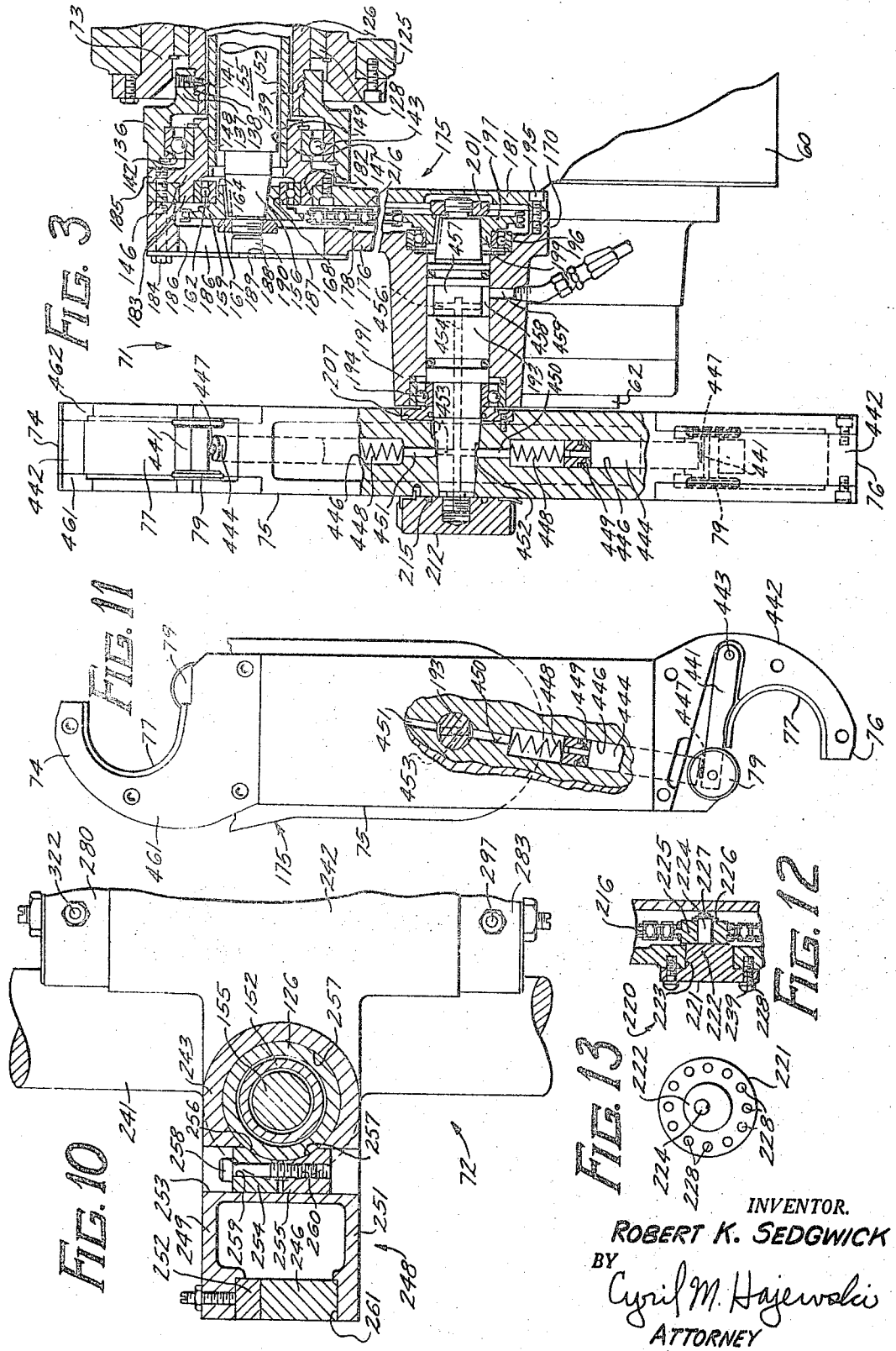

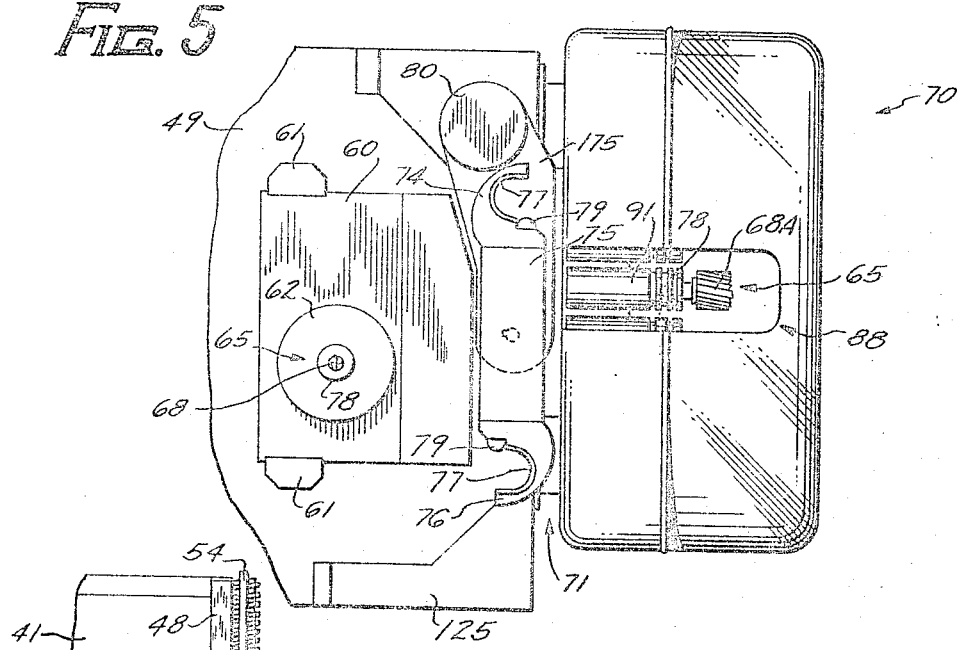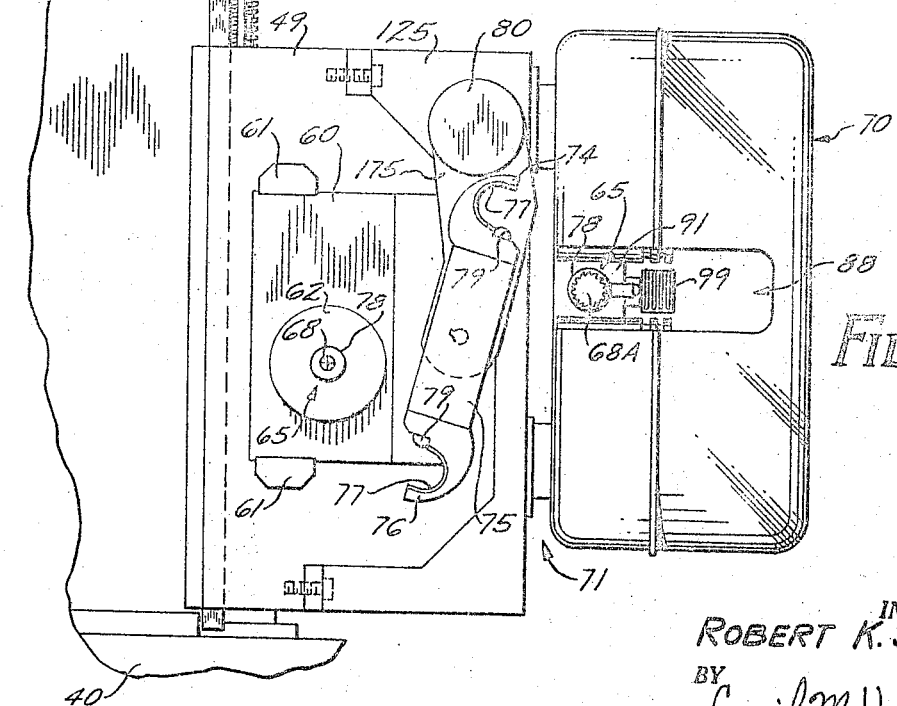

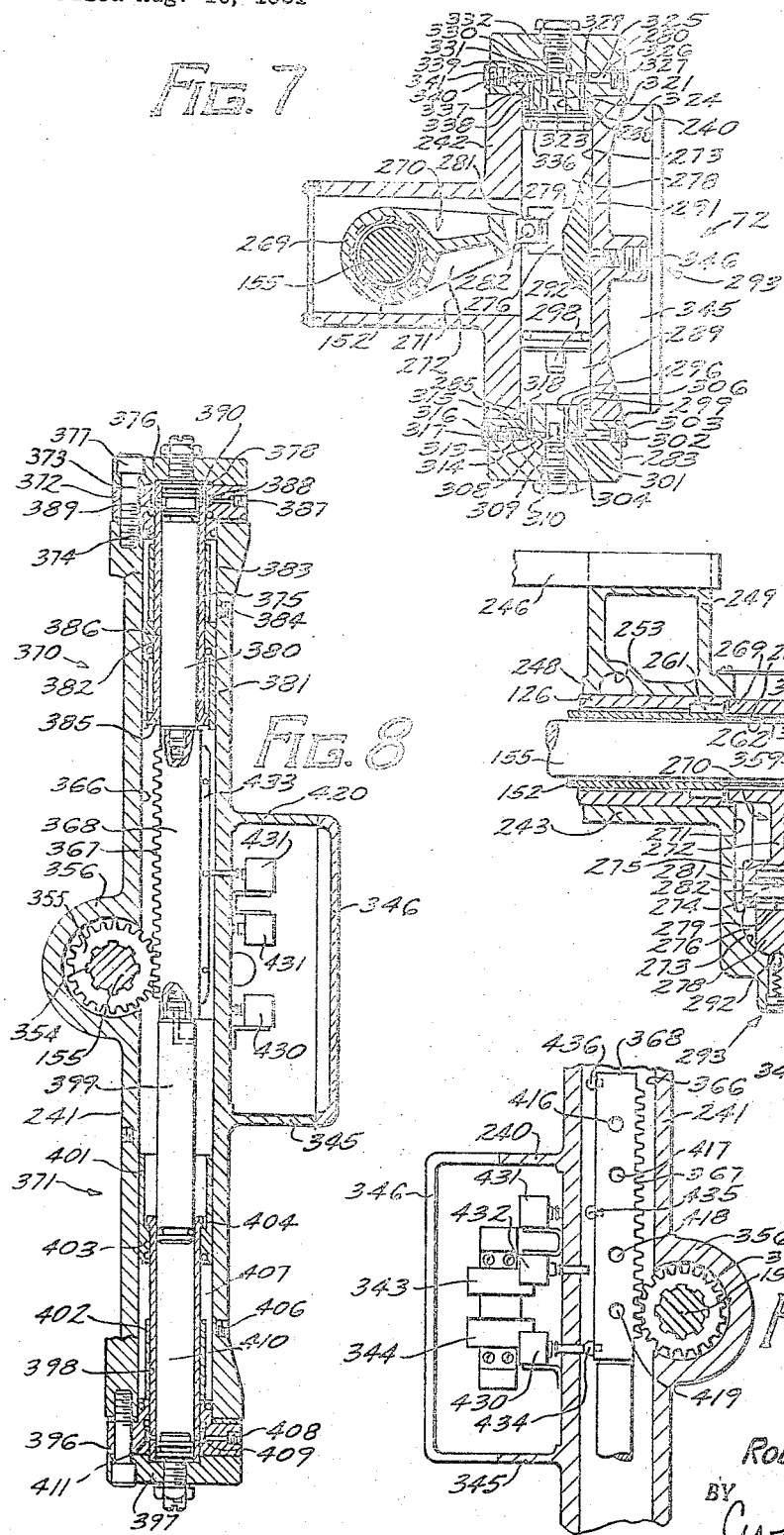
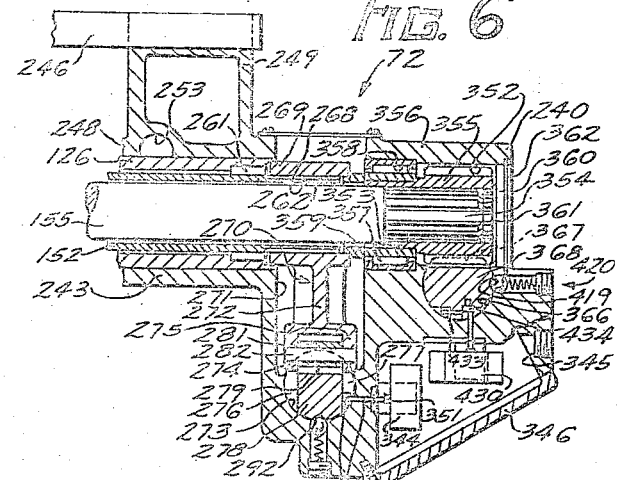

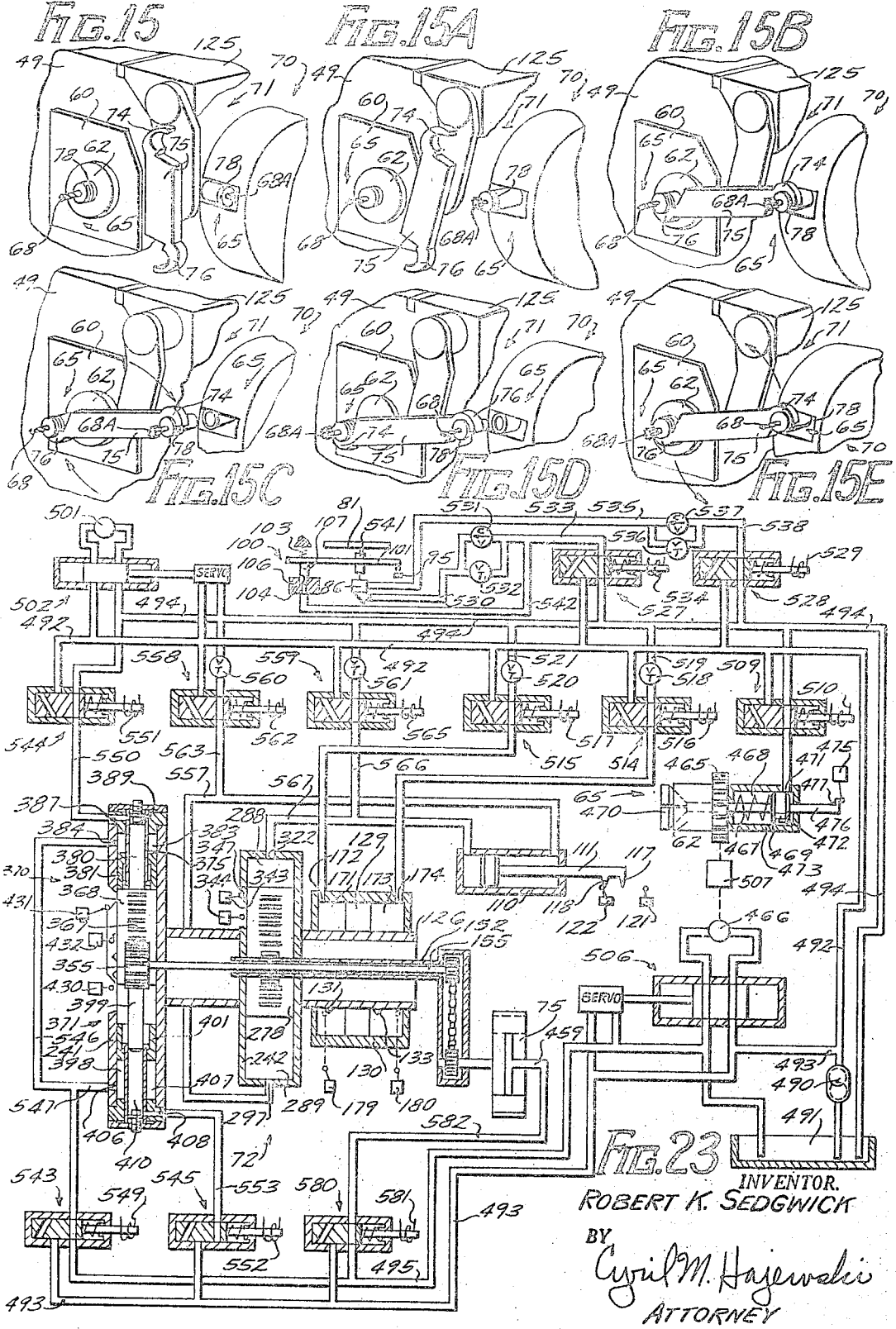

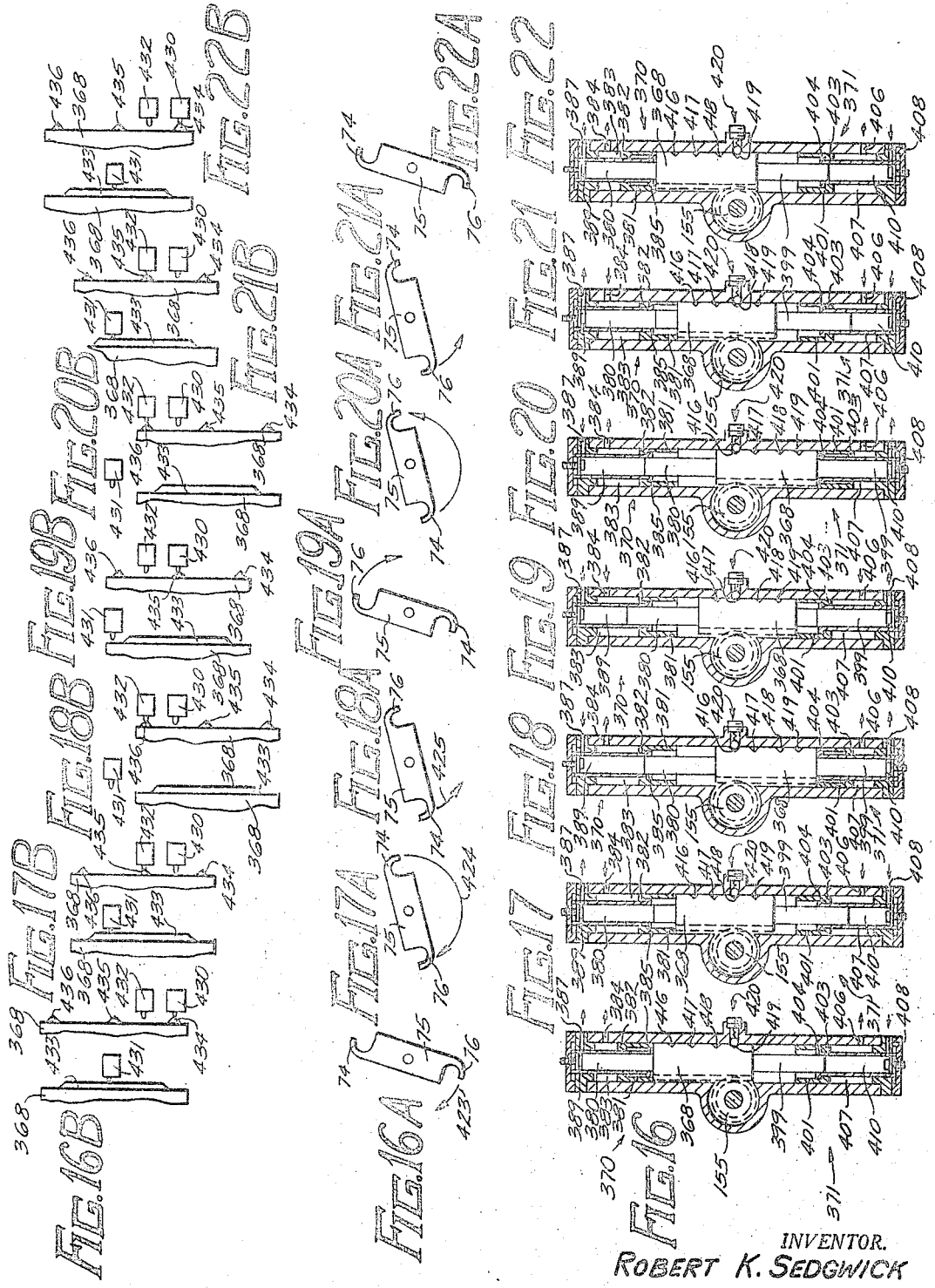

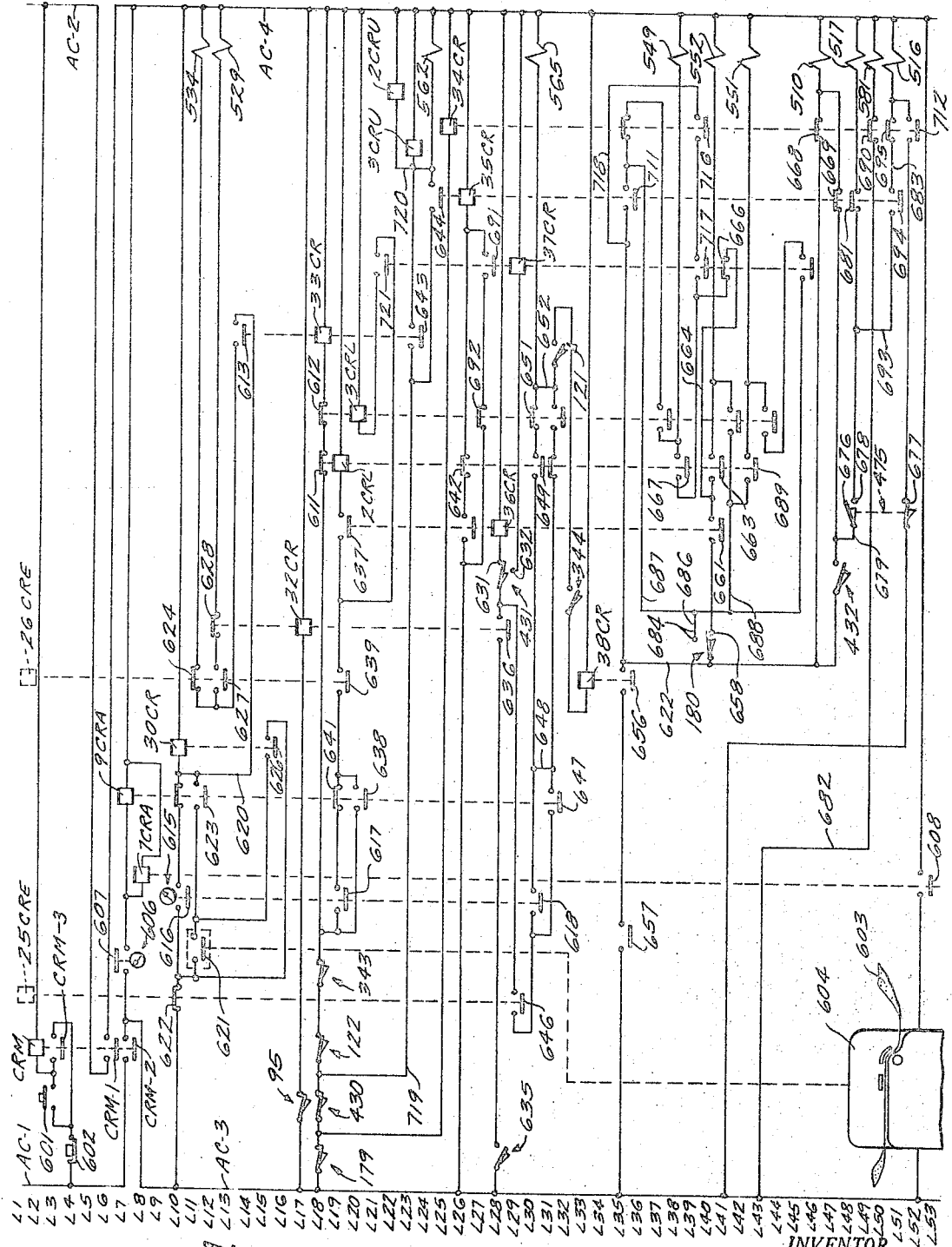

United States Patent Office 3,348,298
Patented Oct. 24, 1967

3,348,298
MECHANICAL TOOL CHANGER FOR A
MACHINE TOOL
Robert K. Sedgwick, Waukesha, Wis., assignor to Kearney
& Trecker Corporation, West Allis, Wis., a corporation
of Wisconsin
Filed Aug. 10, 1961, Ser. No. 130,631
2 Claims. (Cl. 29—568)

The present invention relates generally to machine tools and more particularly to a machine tool with a rotary spindle and having an improved automatically operated mechanism operative to replace a cutting tool in the spindle.

An object of the present invention is to provide a tool change arm assembly which is extremely accurate in its operation.

Another object of the present invention is to provide a tool change arm assembly of compact, rigid and simple construction and which is easily adjusted for proper operation.

Still another object of the present invention is to provide a tool change arm assembly having its own actuators that are located so as not to interfere with the operating members of a machine tool in which the assembly is incorporated.

A further object of the present invention is to provide a compact tool change arm assembly which may be incorporated with a machine tool and located with respect to the spindle of the machine tool and a tool storage magazine associated therewith in an advantageous position occupying a minimum of space at the operating side of the machine tool.

Another object of the present invention is to provide a tool change arm assembly which is constructed and arranged to move the tool change arm between a parked position and an operating position about an axis which is parallel to the axis about which the arm is rotatable so that a minimum amount of arm movement is required. According to this invention the machine tool is equipped with a rotary spindle and a plurality of cutting tools adapted to be received by the spindle for rotation with the latter to perform a machining operation. The cutting tools are stored in a magazine and are carried by a rotatable ring therein so that they may be moved in a circular path within the magazine to locate the desired cutting tool at a tool change station. With a selected tool moved into the tool change station a mechanical tool changer may be operated to remove the cutting tool from the magazine and insert it into the spindle for performing the succeeding work operation. At the same time the tool changer removes the cutting tool that was used for the preceding work operation from the spindle and inserts it into the magazine for storage.

The tool change assembly includes a tool change arm having tool grips which are engageable with cutting tools carried by the magazine and the spindle. A novel and simplified unitary assembly of a plurality of shafts and a quill arranged coaxially and which are actuatable rotationally and axially, respectively, to impart three necessary movements to the tool change arm; that is, a translational movement for effecting withdrawal and insertion of cutting tools in the spindle and magazine; an arcuate swinging movement for moving the tool change arm from a parked position to an operating position; and a rotational movement for interchanging the positions of the cutting tools. The unitary coaxial arrangement of the power shafts provides for a more rigid construction with increased accuracy of operation and is more economical to manufacture, adjust and service. With the coaxial arrangement, the pivotal axis for swinging the tool change arm from parked position to an operating position, is parallel to the axis about which the tool change arm rotates in effecting a tool interchange.

The tool change arm is carried by the axially movable quill actuated by hydraulic pressure supplied to a cylinder acting on a piston for effecting the translational movement of the tool change arm. A hydraulic unit is provided for actuating the tool change arm in its arcuate swinging movement and its rotational movement. This unit is carried on the rearwardly extending end of the coaxial shaft assembly and located rearwardly of the spindle head so that it will not interfere with the machine operation.

The foregoing and other objects of this invention, which will become more fully apparent from the following detailed description, may be achieved by means of the exemplifying apparatus depicted in and set forth in this specification in connection with the accompanying drawings, in which:

FIG. 2 is a fragmentary view, partly in right side elevation and partly in vertical section, taken through the tool change assembly illustrating the tool change assembly and its associated hydraulic unit in relation to the tool storage magazine, part of the magazine being broken away to show the tool rotating ring and tool storage sockets;

FIG. 3 is a fragmentary detail view substantially in vertical section illustrating the forward end of the tool change arm assembly;

FIG. 4 is a fragmentary front view of the machine shown in FIGURE 1, illustrating the column saddle, spindle head and magazine with the tool change arm being depicted in its operative position;

FIG. 5 is a fragmentary front view of the machine shown in FIGURE 1, similar to the view in FIG. 4, showing the saddle, spindle head and magazine, with the tool change arm being depicted in its parked or inoperative position;

FIG. 6 is a detail view in horizontal section of the hydraulic tool change arm actuating unit taken along the plane represented by the line 6—6 in FIG. 2;

FIG. 7 is a detail view in vertical section of the relatively small cylinder of the hydraulic tool change arm actuating unit taken along the plane represented by the line 7—7 in FIG. 2;

FIG. 8 is a detail view in vertical section of the relatively large cylinder of the hydraulic tool change arm actuating unit taken along the plane represented by the line 8—8 in FIG. 2;

FIG. 9 is a fragmentary view in vertical section of the relatively large cylinder of the hydraulic tool change arm actuating unit taken along the plane represented by the line 9—9 in FIG. 2, showing the arrangement of its associated limit switches, dogs and piston;

FIG. 10 is a detail view in vertical section taken along the plane represented by the line 10—10 in FIG. 2;

FIG. 11 is a front view of the tool change arm shown in FIG. 3, with parts broken away to show the internal mechanism;

FIG. 12 is a fragmentary detail view in vertical section illustrating the tool arm chain tensioning mechanism;

FIG. 13 is a plan view of the tension plug shown in FIG. 12;

FIG. 14 is a detail sectional view through an end of the tool change arm taken along the plane represented by the line 14—14 in FIG. 2;

Figure 1:
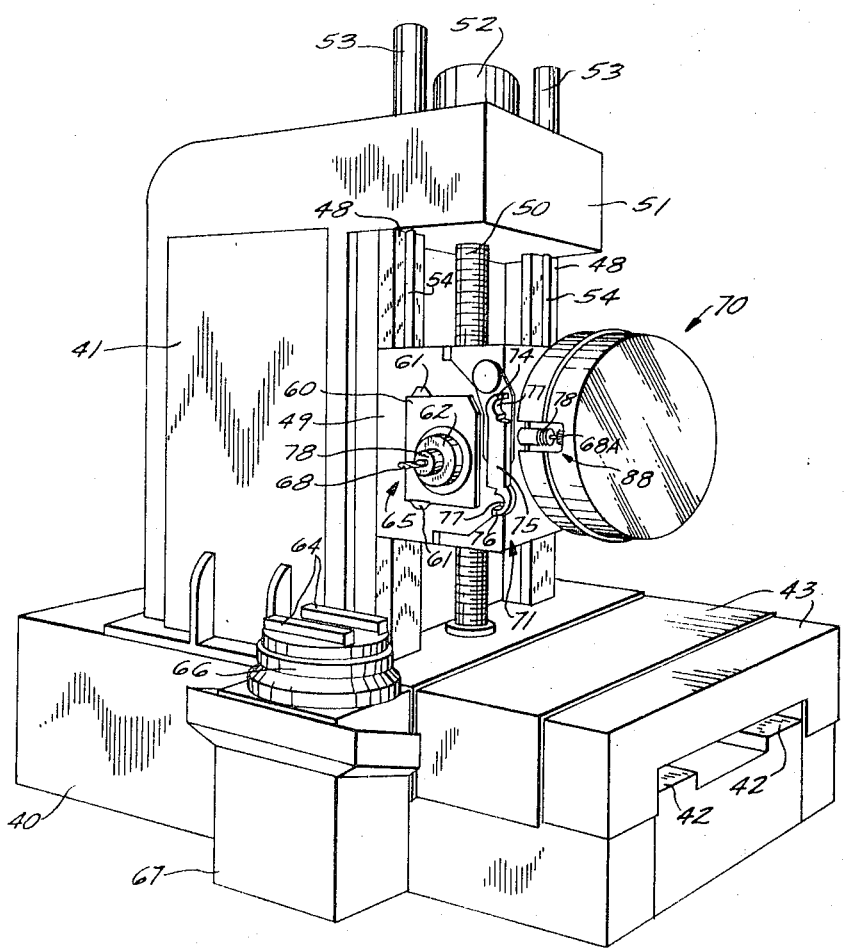
FIGURE 1 is a perspective view of a machine tool in which the features of the present invention are incorporated.

FIGS. 15 to 15E, inclusive, are a series of diagrammatic perspective views of the front of the spindle and magazine of the machine tool shown in FIGURE 1, illustrating the various steps in the cycle of operation of the tool change arm in changing the cutting tool in the spindle;

FIGS. 16 to 22, inclusive, are a series of diagrammatic views illustrating the operation of the hydraulic unit in producing the several rotary positions of the tool change arm;

FIGS. 16A to 22A, inclusive, are a series of diagrammatic views showing the several rotary positions of the tool change arm corresponding to the positions of the actuating plunger of the hydraulic unit as shown in FIGS. 16 to 22, respectively;

FIGS. 16B to 22B, inclusive, are a series of diagrammatic views of the several limit switch actuating dogs which move during the tool change cycle to actuate associated limit switches, the dogs being shown in relation to their associated limit switches in the various positions corresponding to the rotary positions of the tool change arm as depicted in FIGS. 16A to 22A, respectively;

FIG. 23 is a diagrammatic view of the hydraulic circuit; and,

FIG. 24 is an electrical wiring diagram illustrating the control circuit for controlling the operation of the various components in completing a tool change.

Reference is now made to the drawings and specifically to FIGURE 1 thereof, illustrating a machine tool incorporating the features of the present invention. The machine comprises generally a bed 40 which slidably supports an upstanding column 41. To this end, the bed 40 is provided with horizontal ways 42 which are engaged by complementary ways (not shown) formed at the bottom of the column 41 to support the column for sliding movement along the length of the bed 40. A plurality of slidable plates 43 are attached to the bed 40 and the column 41 in telescoping arrangement so as not to interfere with the longitudinal movement of the column 41 while providing a protective covering to prevent the chips which are formed during the machining operation from falling onto the ways 42.

The column 41 is provided with vertical ways 48 for engagement by complementary ways (not shown) formed on a saddle 49 for slidably supporting the saddle in a vertical path of travel. Vertical movement of the saddle 49 in either direction is effected by rotating a screw 50 which is in threaded engagement with a recirculating ball bearing threaded nut (not shown) that is fixed to the saddle 49. The screw 50 is rotatably supported by the column 41, being journaled at its upper end in a cap 51 that is secured to the top of the column 41 and which extends from the column beyond the ways 48 for receiving the screw 50. The lower end of the screw 50 is journaled in a suitable bearing (not shown) that is attached to the column 41 beneath the top of the bed 40. The screw 50 may be rotated in either direction by a motor 52 mounted on top of the cap 51 and connected to rotate the screw 50 for actuating the saddle 49 in its path of travel. A pair of hydraulic pistons and cylinder mechanisms 53 are mounted on top of the cap 51 for connection to the saddle 49 by connecting rods 54 and are arranged in a well known manner to counterbalance the weight of the saddle 49 and its associate mechanism.

A spindle head 60 is carried by the saddle 49 and is provided with horizontal ways 61 which engage complementary ways formed within the saddle 49 for supporting the spindle head 60 for a cross feeding movement in a horizontal path transverse to the direction of travel of the column 41. It is therefore apparent that the column 41, the saddle 49 and the spindle head 60 are each supported for movement in three mutually transverse paths of travel. The spindle head 60 rotatably supports a spindle 62 that is adapted to carry a tool 65 to rotate with the spindle 62 for performing a machining operation. The spindle 62 is rotated by a suitable motor 466, in a well known manner.

The spindle 62 supports the tool 65 in position to operate upon a workpiece (not shown) located on a rotary index table 66 which is mounted on the top of a pedestal 67 that is secured to the front base of the bed 40. In the illustrated embodiment, the rotary table 66 is adapted to receive the workpiece attached to pallets (not shown) which are transported to the table 66 onto a pair of rails 64 by a suitable conveyor (not shown) and clamped to the rails for complete automatic operation. However, it is to be understood, that a conventional rotary index table may be provided with each individual workpiece being manually clamped thereon by the operator.

The machine tool illustrated in FIGURE 1 is equipped with an automatically operable mechanical tool changer mounted on the saddle 49 and constructed in accordance with the teachings of the present invention. To this end, a plurality of tools 65 each having a different cutter 68 are stored in a magazine generally identified by the reference numeral 70. A tool change arm assembly 71 is carried by the saddle 49, as shown in FIG. 2, and includes a hydraulic unit 72 which serves to actuate a tool change arm 75 for performing its function of withdrawing a selected tool 65 from the magazine 70 and inserting it into the spindle 62 to render it operative for performing a machining operation. At the same time, the tool change arm 75 operates to withdraw the tool 65 already located in the spindle 62 and places it in the magazine 70 for storage.

The tool change arm 75 is rotatably supported by a tool change arm carrier 175 which, in turn, is mounted for pivotal movement about a horizontal axis 80 for bodily moving the tool change arm 75 between a parked position and an operating position. FIGS. 1 and 5 illustrate the tool change arm 75 located in its parked position out of the path of travel of the spindle head 60, being located between the rear surface of the magazine 70 and the right side of the spindle head 60. When a tool change is to be effected, the tool change arm carrier 175 is pivoted in a vertical plane to the left, about a horizontal axis 80 as viewed in FIGURE 1, to swing the tool change arm 75 leftwardly approximately 15° from the parked position it occupies as shown in FIG. 5, to the operating position it occupies as depicted in FIG. 4 where it is properly located in its operating position, for performing a tool changing operation.

The tool grips 74 and 76 on the ends of the tool change arm 75 are ach provided with a pair of substantially semi-circular surfaces 77 for receiving a collar 78 secured to each tool 65. A pair of spring urged rollers 79 are included in the tool grips 74 and 76 for yieldably retaining the tools 65 within the semi-circular surfaces 77 in a manner to be subsequently described.

FIGS. 15 to 15E, inclusive, diagrammatically illustrate the cycle of operation of the tool change arm 75 in replacing a tool 65 in the spindle 62. FIG. 15 shows the tool change arm 75 in its parked position. In response to a proper signal, the hydraulic unit 72 is actuated to swing the tool change arm 75 about the horizontal axis 80 in a clockwise direction as viewed from the front to move the tool change arm 75 bodily in an arc from from its parked position to its operative position as illustrated in FIG. 15A. While the tool change arm 75 is being moved to the operative position, the selected tool 65 is also pivoted outwardly of the magazine 70 to render it accessible to the tool change arm 75 as depicted in FIG. 15A.

When the tool change arm is shifted to its operative position by the hydraulic unit 72 it is positioned intermediate of the extended tool 65 in the magazine 70 and the spindle 62, as shown in FIG. 4, so that the tool grips 74 and 76 on the arm 75 can engage the tools therein when the arm is rotated. The arm 75 is then rotated by the hydraulic unit 72 through an arc about its horizontal axis in a clockwise direction as viewed from the front of the machine. Such rotation moves the tool change arm 75 to the position shown in FIG. 15B wherein the grip 74 is in engagement with the tool 65 that is extending from the magazine 70 and the grip 76 is in engagement with the tool 65 that is carried by the spindle 62. It will be observed that the tool 65 that is extending from the magazine 70 is provided with a milling cutter 68A while the tool 65 located in the spindle 62 is provided with a drill 68, and the illustrated cycle shows the tool change arm 75 replacing the drill 68 in the spindle 62 by the milling cutter 68A.

With the tool change arm 75 positioned as depicted in FIG. 15B, the grips 74 and 76 have grasped the two tools 65 for the purpose of withdrawing them from the spindle 62 and the magazine 70. The tool change arm 75 is therefore moved forwardly by the hydraulic unit 72 and the two tools 65 move with it out of the spindle 62 and the magazine 70, as depicted in FIG. 15C.

After the two tools have been extracted from the spindle 62 and the magazine 70, the tool change arm 75 is rotated 180° in a clockwise direction, as viewed from the front of the machine and as indicated by the arrows in FIG. 15C, to the position depicted in FIG. 15D. Such rotation of the tool change arm 75 functions to move the drill 68 from alignment with the spindle 62 into alignment with the magazine 70 and the milling cutter 68A has been moved from alignment with the magazine 70 into alignment with spindle 62. When the drill 68 and the milling cutter 68A have been interchanged by one half of a revolution of the tool change arm 75, the latter will be retracted towards the machine to insert the two tools 65 into the spindle 62 and the magazine 70, as illustrated in FIG. 15E so that the milling cutter 68A is inserted into the spindle 62 and the drill 68 is moved into the magazine 70, as shown in FIG. 15E.

From the position shown in FIG. 15E the tool change arm 75 is moved in a counterclockwise direcion as indicated by the arrows in FIG. 15E to the position depicted in FIG. 15A. In this position the tool change arm is located 180° from its position at the start of the tool change cycle and the tool grips 74 and 76 have been transposed. The tool grips 74 and 76 are thus moved out of engagement with the respective tool 65 and the tool change has been completed, the drill 68 having been replaced in the spindle 62 by the selected milling cutter 68A.

When the tool change arm 75 is positioned, as illustrated in FIG. 15A, it is located in front of the spindle head 60 and would interfere with the performance of a machining operation. The hydraulic unit 72 is therefore actuated to swing the tool change arm 75 in a counterclockwise direction to shift the tool change arm 75 from its operative position to its parked position illustrated in FIG. 15 wherein it does not interfere with the operation of the spindle head 60. As the tool change arm 75 is being moved to its parked position, the tool 65 that has been placed in the magazine 70 is pivoted into the magazine 70 for storage and the latter may be operated in a manner to be subsequently described for selecting the succeeding tool which is to be placed in the spindle 62 by the tool change arm 75.

As shown in FIGURE 1, the magazine 70 is secured to right side of the saddle 49, for movement with the saddle 49 in its vertical path of travel. The construction of the magazine 70 is set forth in detail in a copending application of Wallace E. Brainard et al., Ser. No. 744,976, filed June 27, 1958, now Patent No. 3,052,011, dated Sept. 4, 1962, and reference made thereto for specific details of the magazine. In general the magazine 70 comprises a tool carrying ring 81 rotatably supported in a housing 82, as depicted in FIG. 2. The tool carrying ring 81 is rotatably driven by means of a fluid motor 86 that is mounted on a front plate 87 carried by the magazine 70. The motor 86 is operably connected through a gear train (not shown), in a well known manner, for the purpose of rotating the ring to locate a selected tool at a tool change station 88 where they may be made accessible to the tool change arm 75. The tool change ring 81 supports a plurality of tool storage sockets 91, each of which is adapted to receive a tool 65 and is so arranged in the tool change ring 81 that it may be swung outwardly of the magazine 70 at the tool change station 88 to be made available to the tool change arm 75 for a tool change operation. The precise control of the motor 86 for accurately locating the selected tool 65 at the tool change station 88 is achieved by means of a limit switch 95 which is actuated by means of a rocker arm 101 through a control mechanism, generally represented by a block 541 in FIG. 23. The control mechanism 541 is set forth in detail in the aforementioned U.S. Patent No. 3,052,011.

Actuation of the limit switch 95 serves to deenergize a solenoid valve for terminating operation of the motor 86 to accurately position one of the tool storage sockets 91 containing the selected tool 65 at the tool change station 88. The tool change mechanism 71 may then be operated to replace the tool 65 in the spindle 62 with another tool 65 withdrawn from the tool storage socket 91 at the tool change station 88. It is to be understood that the rotation of the ring 81 to position the selected tool at the tool change station 88 may occur while a machining operation is being performed with the tool 65 that is in the spindle. When such machining operation is completed the succeeding desired tool will be located at the tool change station and the tool change mechanism may be operated immediately to effect a tool change in the spindle.

The purpose of the tool carrying ring 81 is to carry a variety of tools 65 in storage and to move the selected tools individually to the tool change station 88 where they may be made accessible to the tool change arm 75. The tools carried in the magazine 70 are disposed in individual tool storage sockets 91 with each socket being pivotally mounted on the rotary ring 81. When the selected tool is moved into the tool change station 88 the socket 91 may be pivoted outwardly so that the axis of the tool 65 extends from the periphery of the drum 70 substantially parallel to the axis of the spindle 62.

The particular magazine 70 illustrated, is arranged to carry 30 tools and, with the tool in the spindle, a total of 31 tools are available for selective insertion in the spindle 62. It will be realized that while the tool magazine has been described as carrying a particular number of tools, the magazine size may be made larger or smaller to accommodate a greater or lesser number of tools as may be desired. Each tool is coded in accordance with the binary system to indicate the number of the tool. Thus, each tool is provided with a plurality of peripheral strips around the collar 78, as indicated in FIG. 5, and which constitute the coding, with each of the strips representing one of the digits of the binary system in the present example. Each of these peripheral strips may be provided with a peripheral land or ring to indicate the numeral 1 for that particular digit of the binary number, and the absence of a peripheral land along any of the peripheral strips indicates the numeral 0 for that particular digit of the binary system.

Such coding of the tools 65 is read by a reading head 99, shown in FIG. 4, in a well known manner. Prior to actuating the motor 86 for rotating the ring 81, the identification number of the desired tool is impressed upon a tool selecting circuit (not shown) of an electrical control system either manually or automatically. Then, as the ring 81 is rotated, the tool reading head 99, shown in FIG. 4, will read the code on the collars 92 of the tools 65 as they move past the reading head and when the number read by the reading head coincides with the number impressed upon the tool selecting circuit (not shown) of the electrical control system, the latter will operate to deactuate the motor 86 and thereby stop the rotation of the ring 81 for accurately locating the selected tool 65 at the tool change station 88. A reading head and tool selection circuit suitable for the present application are shown and described in the aforementioned U.S. Patent No. 3,052,011. The precise control of the motor 86 for accurately locating the selected tool 65 at the tool change station is achieved by means of a positioning mechanism generally identified by the reference numeral 100 in FIG. 2 and which is also illustrated diagrammatically in FIG. 23.

The rotation of the tool carrying ring 81 for positioning a selected tool at the tool change station 88 may occur while a machining operation is being performed with a tool 65 that is in the spindle 62. When such machining operation is completed, the succeeding desired tool 65 will be located at the tool change station 88, and the tool change assembly 71 may be operated immediately to effect a tool change in the spindle 62.

The diameter of the magazine 70 is kept to a minimum by carrying the tool storage sockets 91 within the magazine for storing the cutters or tools 65 with their axes substantially parallel to the axis of the magazine. As previously mentioned, however, each of the tool storage sockets 91 is pivotally supported on the ring 81. In order to effect a tool change, the storage socket 91 at the tool change station 88 and containing the selected tool 65 must be pivoted outwardly so that the axes of the socket 91 and its associated tool 65 extend substantially perpendicular to the axis of the magazine. The tool storage socket 91 must therefore be pivoted approximately 90° to move its associated tool 65 outwardly of the periphery of the magazine. Such pivotal movement of the selected storage socket 91 is produced through the operation of a piston and cylinder mechanism 110 which is mounted on the plate 87 of the magazine as shown in FIG. 2. The piston and cylinder mechanism 110 includes a piston rod 111 having a plate 112 fixed to its extending end. The plate 112 is attached to a plunger 113 which is slidably supported for axial movement by a guide 114 that is carried by the front plate 87 of the magazine 70. When plunger 113 is moved axially to the left, as viewed in FIG. 2, by operation of the piston and cylinder mechanism 110, it moves into engagement with a socket 91 that is positioned at the tool change station 88. Continued movement of the plunger 113 effects pivotal outward movement of the socket so that its axis is substantially normal to the axis of the magazine 70. The tool 65 will then extend outwardly of the magazine 70 in position to be engaged by one of the tool grips 74 or 76 of the tool change arm 75.

The plate 112 extends outwardly from the guide 114, laterally of the piston rod 111. A bracket 116 is secured to the bottom edge of the plate 112 and is provided with a pair of dogs 117 and 118 which are adjustably mounted in position to engage the plungers of a pair of limit switches 121 and 122, respectively. When the plunger 113 is retracted, as illustrated in FIG. 2, the dog 118 engages the plunger of the limit switch 122 to actuate the switch. As the piston rod 111 moves forwardly to advance the plunger 113, the dog 118 releases the plunger of the limit switch 122. When the plunger 113 reaches its forward limit of movement, the dog 117 engages the plunger of the limit switch 121 to actuate the switch for the purpose of indicating that a tool 65 is extending outwardly of the magazine 70 and the tool is in position to be engaged by the tool grips of the tool change arm 75.

As previously stated, the hydraulic unit 72 is operable to swing the tool change arm 75 between an operating position and a parked position and is also operable to axially extend the arm for the purpose of withdrawing tools from the extended socket 91 and from the spindle 62 simultaneously. Furthermore, after the hydraulic unit has rotated the arm to interchange the position of the tools, it is operable to retract the arm to insert the interchanged tools into the socket 91 and spindle 62.

Translational movement of the tool change arm 75 for extending and retracting it, is effected by a quill 126 supported for axial movement in the tubular cylinder 73 in coaxial relationship thereto. Movement of the tool change arm 75 between its parked position and its operating position is effected by rotation of a tubular parking shaft 152 rotatably supported in coaxial relationship in the quill 126. The shaft 152 is operably connected to the tool change arm carrier 175 to effect its pivotal movement about the axis of the shaft 152. This pivotal movement of the carrier 175 operates to swing the tool change arm 75, which is rotatably supported on the free end of the carrier 175, between its parked position and its operating position. Rotational movement of the tool change arm 75 for completing a tool change is effected by the rotation of a shaft 155 coaxially arranged in the tubular shaft 152.

As shown in FIG. 2, the tubular cylinder 73 is fixedly supported in a horizontal opening provided in a generally U-shaped mounting bracket 125 that is secured to the saddle 49. The elongated tubular quill 126 is carried within the cylinder 73 and is supported at three points therein to insure accurate alignment of the quill in any extended position. To this end, a rear bearing sleeve 127 is mounted within the rear portion of the supporting cylinder 73 being locked therein by means of a snap ring. The bearing sleeve 127 serves to slidably support the quill 126 within the cylinder 73 for axial movement. The forward portion of the quill 126 is likewise slidably supported in a bearing sleeve 128 that is mounted in the forward end of the supporting cylinder 73, being likewise locked in position by means of a snap ring. The quill 126 is provided with an integrally formed piston 129 that reciprocates within the bore of the cylinder 73 between the end bearing sleeves 127 and 128. Thus, hydraulic pressure is admitted into the annular space between the cylinder 73 and the quill 126 for moving the piston 129 between the two bearings 127 and 128 to effect the axial movement of the quill 126 for extending and retracting the tool change arm 175. The piston 129 serves not only to effect the axial movement of the quill 126 but also to support the central portion of the quill intermediate the bearings 127 and 128.

A quill bearing carrier 136 is removably mounted on the forward end of the quill 126 for axial movement with it. As shown in FIG. 3, the bearing carrier 136 is provided with a hub 137 that is provided with an axial bore having an internally threaded portion 138. The forward end of the quill 126 is of reduced diameter and formed with a threaded portion 139 to threadedly receive the bearing carrier 136. A dog screw 141 is threadedly engaged in a suitable threaded opening provided in the hub 137 and engages an aligned opening provided in the threaded portion 139 of the quill 126 to lock the carrier to the quill.

A shaft carrier 146 having an axial hub 147 is mounted on and secured to a reduced forwardly extending portion of the tubular shaft 152. An antifriction bearing 143 is mounted on the axially extending hub 147 and is disposed in an enlarged recess 142 formed in the bearing carrier 136 to rotatably support the shaft carrier 146 as well as the associated forward end of the shaft 152. A snap ring 148 is disposed in an annular groove formed on the periphery of the hub 147 and engages the inner race of the bearing 143, as shown in FIG. 3, to lock the carrier 146 in position. With the carrier 146 secured to the tubular parking shaft 152, rotation of the parking shaft will impart a like rotation to the shaft carrier 146.

The tool arm rotating shaft 155, rotatably carried within the tubular parking shaft 152, is provided with a tapered end 156 for receiving a sprocket 159 which is keyed thereto so as to rotate with the shaft 155. An axial hub 164 extends rearwardly from the sprocket for receiving an antifriction bearing 162 which is mounted in the carrier 146 for rotatably supporting the sprocket gear as well as its associated forward end of the shaft 155. The sprocket 159 is retained on the shaft 155 by a nut 167 which is threaded on the outer end of the shaft to force the sprocket into engagement with the inner race of the bearing 162.

Advancement of the tool change arm 75 is accomplished by axial leftward movement of the quill 126 which is effected by fluid pressure supplied to a chamber 171 through a port 172 provided in the supporting frame 73. Such leftward movement of the quill 126 will move the carrier 136 in the same direction, which, in turn. moves the carrier 146 and its associated tubular shaft 152 leftwardly. Leftward or outward movement of the carrier 146, also, serves to effect axial leftward movement of the tool arm rotating shaft 155. Accordingly, axial movement of the quill 126 in either direction will operate to move both the parking shaft 152 and the tool arm rotating shaft 155 with it.

A pair of limit switches 179 and 180 are provided, as shown in FIG. 2, for conditioning the electrical circuit for succeeding steps in the tool change cycle. The limit switch 179 is mounted to the rear face of the supporting bracket 125, while the limit switch 180 is carried by an internal web of the bracket 125, as clearly shown in FIG. 2. The limit switch 179 is disposed to be actuated by a dog 131 that is secured in a carrier ring 132 adjustably mounted on the rearward extending portion of the quill 126. On the other hand, the limit switch 180 which is located inwardly or forwardly of the limit switch 179, is actuated by a dog 133 which is formed on the periphery of the carrier ring 132 and which is located beneath the quill 126. Thus, when the tool change arm 75 is fully retracted by reason of the quill 126 being in its retracted position, the dog 131 will actuate the switch 179 and thereby indicate that the tool change arm 75 is fully retracted. On the other hand, when the tool change arm 75 is fully extended by reason of the quill 126 being moved leftwardly, as viewed in FIG. 2, the dog 133 will actuate the switch 180 and indicate in the electrical control system that the tool change arm 75 is fully extended.

Movement of the tool change arm 75 between its operating position and its parked position is effected through the shaft carrier 146 which is operably connected to be rotated by the tool arm parking shaft 152, as previously described. The rotational movement of the shaft carrier 146 is transmitted to the arm 75 through the tool arm carrier 175. The tool arm carrier 175 comprises a carrier frame 176 which is formed with a peripheral flange 170 that extends rearwardly of the body of the frame towards the saddle 46 and defines a recess 178. A cover 181 is arranged to fit snugly on the peripheral flange 170 and is secured thereto by screws 195. The cover 181 is provided with a circular opening 182 at the top end thereof which is provided for the purpose of mounting the cover about an axial outwardly extending hub 183 provided on the carrier 146 and in which the antifriction bearing 162 is mounted. The entire assemblage of the frame 176 and cover 181 is secured as a unit. to the carrier 146 by means of a plurality of screws 184 engaged in suitable threaded openings provided in a radially extending flange 185 formed on the carrier 146, as shown in FIG. 3. Thus, as the tool arm parking shaft 155 is rotated in either direction, the carrier 146, being secured thereto, will rotate with it and will operate to effect a pivotal movement of the tool arm carrier assembly 175. Pivotal movement of the assembled tool arm carrier 175 operates to swing the tool between its parked position and its operating position, as previously mentioned. The tool arm carrier 175 also serves as a transmission case for a chain drive which is operative to transmit the rotational movement of the shaft 155 to the tool change arm 75, as will be subsequently described.

The upper end of the tool arm carrier 176 is provided with an opening 186 which provides access for adjusting the lock nut 167. The access opening 186 is closed by means of a cover plate 187 which is secured to the outer surface of the carrier frame 176. As shown in FIG. 3, the cover plate 187 is provided with a relatively small opening 188, the axis of which coincides with the axis of the tool arm rotating shaft 155. The opening 188 receives a hub 189 of an abutment 190 which is disposed so that its inner face abuts the outer end of the shaft 155. As a result axial displacement of the shaft 155 leftwardly or outwardly is prevented to avoid displacement of the parts of the assembly.

The tool change arm 75 is driven in its rotational movement by a tool arm shaft 193 journaled in a hub 191 integrally formed on the lower end of the carrier 175. A sprocket 197 is keyed to a rearward tapered portion of the shaft 193. An axial hub 199 extends from the sprocket 197 for receiving an antifriction bearing 196 which is mounted in the hub 191 for rotatably supporting the sprocket 197 as well as the associated rearward end of the shaft 193. The sprocket 197 is retained on the shaft 193 by a nut 201 which is threaded on the shaft 193 to force the sprocket into engagement with the inner race of the bearing 196.

The forward end of the shaft 193 is rotatably supported in an antifriction bearing 194 that is mounted in the forward end of the hub 191. The tool change arm 75 is keyed to the tapered outwardly extending end of the shaft 193. A seal retainer 207 is mounted about the shaft 193 and is disposed in a recess formed in the rear face of the tool change arm 75. A nut 212 threadedly engaged on the outer end of the shaft 193 retains the arms 75 in operative position on the shaft 193. The arm 75, in turn, forces the retainer 207 against the inner race of the antifriction bearing to lock the bearing in the hub 191.

The locking nut 212, which is disposed to engage the arm 75, is provided with an annular groove which receives an O ring 215 that serves to effect a seal of the joint between the outer surface of the arm 75 and the inner axial face of the lock nut 212. Thus, the entire assembly of the shaft 193, the arm 75, the sprocket 197 and the bearings 194 and 196 are locked in position within the hub 191 by means of the inner lock nut 201 and the outer lock nut 212, as shown in FIG. 3.

Power from the shaft 155 is transmitted to rotate the sprocket 159, as previously described, with the power being transmitted from the sprocket 159 to the sprocket 197 by means of an endless chain 216 which is entrained over both of the sprockets 159 and 197.

Tensioning of the chain 216 for the removal of slack is effected by means of a tensioning roller mechanism, generally identified by the reference numeral 220, and mounted on the frame 176 as depicted in FIGS. 2 and 12. As shown in FIG. 12, the tensioning mechanism comprises a circular body member 221 having an axially extending hub 222 that is disposed in an opening 223 formed in the carrier frame 176. Extending outwardly from the hub 222 is a pin 224, the axis of which is offset relative to the axis of the hub 222. A roller 225 is rotatably mounted on the pin 224 and is maintained in position by means of a washer 226 and a snap ring 227. The peripheral surface of the roller 225 is disposed to engage against the chain 216 so that as the chain 216 passes from the sprocket 159 to the sprocket 197 it passes over the roller 225. For maintaining the body member 221 in any desired angular position within the opening 223, an annular series of screw receiving openings 228 are formed in the hub 222. These openings are adapted to align with suitable threaded openings 229 provided in the frame 176 so that screws 230 may be passed through the openings in the body 221 into threaded engagement with the threaded openings 229. Angular adjustment of the body 221 in the opening 223 will cause the pin 224 to orbit about the axis of the hub 224, which will effect a change in the position of the roller 225 relative to the chain 216 to adjust the tension on the chain. When a desired tension is placed upon the chain 216, the screws 230 are passed through the openings 228 in the body 221 and threadedly engaged in the openings 229 provided in the frame to lock the body member 221 in the adjusted position.

The hydraulic unit 72 functions to position the tool arm in either an operating position or a parked position as well as to rotate the tool change arm for effecting a tool change, as previously described. As shown in FIGS. 2 and 6, the hydraulic unit 72 includes a motor housing 240 which is provided with a relatively long vertical cylinder 241 and a relatively short cylinder 242 that is arranged parallel to the relatively long cylinder 241. The housing 240 also includes a horizontal forwardly extending tubular mounting collar 243 which is adapted to be mounted on the extending rear end of the quill 126, as shown in FIGS. 2, 6 and 10. The arrangement is such that the hydraulic unit 72 will move with the quill 126 when the latter is actuated in its axial movement.

The rearwardly extending end of the quill 126 is received in the mounting collar 243 and is clamped therein so that the hydraulic unit will move with the quill in its axial movement. As shown in FIG. 10, a pair of shoes 254 and 255 having arcuate surfaces 256 and 257, respectively, are disposed within a vertical opening 253 into which a portion of the peripheral surface of the quill extends. The shoes 254 and 255 are arranged in the opening 253 so that their arcuate surfaces engage the peripheral surface of the quill. A screw 258 is inserted through an opening 259 formed in the shoe 254 into threaded engagement in a suitable threaded opening 260 provided in the shoe 255. Tightening of the screw 258 serves to force the arcuate surfaces of the shoes into tight clamping engagement with the peripheral surface of the quill 126. Thus, the hydraulic unit 72 is locked to the quill for simultaneous movement therewith.

With the shaft 152 rotatably supported in coaxial relationship in the quill, the rotational movement of the shaft 152 could impart rotation to the quill 126 which, in turn, would rotate the hydraulic unit 72. To avoid such rotation of the quill and hydraulic unit provision has been made for maintaining the hydraulic unit in its upright operative position and through it prevent the inadvertant rotation of the quill. To this end, a bracket 248 is integrally formed with the housing 240 and extends outwardly therefrom to the left, as viewed in FIG. 10. The free end of the bracket is bifurcated froming an upper arm 249 and a lower arm 251. The upper arm is provided with a shoe 252 of relatively soft material, such as brass, which is disposed to slidably engage the upper surface of an elongated rectangular bar 246 that is secured to the side of the supporting bracket 125 by a plurality of bolts 247. A bearing surface 261 is provided on the upper surface of the lower arm 251 and engages the bottom surface of the bar 246. Thus, the hydraulic unit 72 is free to move with the quill, while being guided and maintained in its upright position by the cooperative sliding engagement of the bracket 248 with the bar 246. The hydraulic unit, in turn, will prevent the quill from rotating in the tubular cylinder 73.

The swinging movement of the tool change arm 75 between its operating position and its parked position is effected by rotation of the tubular parking shaft 152. As viewed in FIG. 6 the tubular shaft 152 is journaled in an antifriction bearing 261 which is disposed within an enlarged portion of the bore of the quill 126. In order to effect a driving connection between the hydraulic unit 72 and the tubular shaft 152 the latter extends rearwardly beyond the bearing 261 into splined engagement with internal splines formed in a bore 268 provided in the hub 269 of a crank 270.

As shown in FIGS. 6 and 7, the crank 270 is disposed within a compartment 271 formed in the frame 240 with an arm 272 of the crank extending into a bore 273 of the relatively short cylinder 242. The end of the arm 272 extending into the bore of the cylinder 242 is bifurcated to form legs 274 and 275. The legs 274 and 275 are disposed within side recesses 276 and 277 formed on each side of a piston 278 which is reciprocally supported in the cylinder 242. The legs 274 and 275 of the arm 272 engaged within the recesses 276 and 277 of the piston 278 are located on either side of a transverse recess 279, also, formed in the piston 278 midway between its ends. The legs 274 and 275 straddle a pivot block 281 which is slidably disposed within the recess 279 and is connected to the legs 274 and 275 by a dowel 282.

This connection causes the axial movement of the piston 278 to pivot the crank about the axis of its hub 269 to rotate the shaft 152 and thereby pivot the carrier 175 to swing the tool change arm 75 between its operating and parked positions. As the crank pivots, its arm connected to the piston 278 moves in an arc. To accommodate this arcuate movement of the end of the crank, the slide block will move within the transverse recess 279 in a direction normal to the axis of the piston 278. In this manner a driving connection is maintained between the piston and the arm of the crank for any axial position of the piston.

The ends of the cylinder 242 are closed by cylinder caps 280 and 283 that are fixed to the cylinder and are provided with axial hubs 284 and 285 respectively, that extend into the ends of the bore 273 to seal it. Movement of the tool change arm 75 from the parked position, shown in FIGS. 1 and 5, to its operating position depicted in FIG. 4, is effected by supplying fluid pressure to a chamber 288 at the upper end of the piston 278, as shown in FIGS. 7 and 23. Fluid pressure to the chamber 288 will effect axial downward movement of the piston 278, as viewed in FIG. 7, to pivot the crank 270 in a clockwise direction about the axis of its hub 269. Such pivotal movement of the crank 270 rotates the tubular shaft 152 in a clockwise direction for pivoting the carrier 175 about the axis of the shaft 152. As a result, the tool change arm 75 is swung leftwardly from the position shown in FIG. 5 to the position shown in FIG. 4. On the other hand, fluid pressure supplied to a chamber 289 at the lower end of the piston 278 will effect upward axial movement of the piston 278 for returning the tool change arm 75 to its parked position illustrated in FIG. 5.

The piston 278 has two positions within the bore 273 for moving the tool change arm between its operating position and its parked position. Two notches 291 and 292 are formed in the periphery of the piston 278, as shown in FIGS. 6 and 7, which cooperate with a resiliently biased detent mechanism, generally identified by the reference numeral 293, to yieldably retain the plunger 278 in either one of its two positions.

Fluid pressure supplied to the chamber 288 will serve to move the piston 278 downwardly. At this time fluid in the chamber 289 at the lower end of the piston 278 will exhaust therefrom via an axial passage or bore 296 formed in the cap 283. The bore 296 has communication with a port 297 formed from the periphery of the cap 283 as shown in FIG. 2 and diagrammatically in FIG. 23. As the piston 278 moves downwardly an axially extending pin 298 formed on the lower end of the piston 278 will enter the bore 296 and seal it to prevent further escape of fluid from the chamber 289. At this time the fluid remaining in the chamber 289 will exhaust therefrom via a passage 299, of relatively small diameter which communicates with a chamber 301 extending radially through the cap 283. The chamber 301 receives a needle valve 302 which is provided with an enlarged threaded head portion 303 that is engaged in an enlarged portion of the chamber 301 to facilitate the axial adjustment of the needle valve within the bore. A passageway 306 extends from the inner end of the chamber 301 and communicates with the bore 296. By adjusting the needle valve 302 the flow of fluid through the passage 306 may be regulated as desired. Thus, with the pin 298 of the piston 278 engaged within the axial bore 296 of the cap 283, the fluid in the chamber 289 will escape therefrom via the passage 299 and will flow over the needle 304 of the valve 302 and exhaust through the passage 306 at a rate as determined by the setting of the needle valve 302. The exhaust fluid will flow into the bore 296 and thence from the bore 296 through the port 297 to return to a reservoir. With this arrangement the final movement of the piston 278 is controlled so that a smooth movement of the tool change arm 75 is obtained. As the pin 298 enters further within the bore 296 it will engage a plug 308 which is adjustably disposed within the bore 296 and serves as a positive stop for limiting the axial downward movement of the piston 278. The location of the plug 308 therefore establishes the limit of movement of the tool change arm 75 as it moves to its operating position. The plug 308 is threaded in the bore 296 to render it adjustable for varying the operating position of the tool change arm 75.

In order to shift the piston 278 to its upper position for moving the tool change arm 75 to its parked position fluid pressure must be supplied to the chamber 289 while the chamber 288 is connected to exhaust. The port 297 shown diagrammatically in FIG. 23, will be connected to the source of fluid pressure to supply the pressure to the chamber 289. The fluid pressure supplied via port 297 will flow into the bore 296 which at this time is sealed by the pin 298. Therefore in order to impart upward movement to the piston 278 an auxiliary supply circuit has been provided in the cap 283 for supplying the chamber 289 with fluid pressure. To this end the cap 283 is provided with another radially extending chamber 313 which extends from the peripheral surface of the cap inwardly and communicates with a passage 314 of relatively small diameter. The passage 314, in turn, communicates with the bore 296. The communication between the chamber 313 and the passage 314 is normally blocked by a ball 315 that is urged inwardly by a spring 316 to seat against the communicating opening. The spring 316 is compressed by a screw 317 which is threadedly engaged in the chamber 313. The ball 315 normally closes the passage 314 so fluid that flows from the chamber 289 into the bore 296 cannot exhaust through the passage 314. However, the pressure of the fluid supplied via the port 297 to the bore 296 is high enough to overcome the force of the spring 316 and the ball is moved outwardly to open the passage 314, so that the fluid pressure from the bore 296 will flow through the passage 314 into the chamber 313. The fluid pressure in the chamber 313 will flow through a connecting passage 318 which communicates with the chamber 289. The fluid pressure supplied to the chamber 289 via the auxiliary supply circuit will act on the piston 278 to initiate its upward movement. As the piston 278 moves upwardly the pin 298 will move with it and as it leaves the bore 296 the fluid pressure in the bore 296 will flow directly into the chamber 289 to continue the upward movement of the piston 278.

As the piston 278 is moved upwardly, fluid in the chamber 288 will exhaust into an axial bore 321 provided in the cap 280 and will flow from the bore 321 out through a port 322 which is formed in the cap 280 as shown in FIG. 2. As the piston 278 nears its upper limit of movement a pin 323 formed on the upper end of the piston 278 will enter the bore 321 to seal the bore from the chamber 288. When this occurs, the fluid from the chamber 288 will exhaust through a relatively small diameter passage 324 which is formed from the inner axial face of the hub 284 of the cap 280 and which communicates with the chamber 288 and with a radially extending chamber 325. The chamber 325 serves the same purpose as the chamber 301 of the cap 283, and likewise contains a needle valve 326 having an enlarged threaded head portion 327 which is engaged in an enlarged portion 328 in the chamber 325. A needle 329 of the needle valve 326 is disposed within a communicating passage 330 and serves to meter the flow of fluid through the passage. By adjusting the needle valve 326 to a desired setting, the rate of movement of the piston 278, as it nears its limit of upward travel, may be regulated. In this manner the movement of the tool change arm 75, as it is returned to its parked position, may be controlled to reduce its rate of movement as it approaches its limit of movement.

As the piston 278 reaches its limit of upward movement the pin 323 engages a plug or positive stop 331 that is disposed within the bore 321 and is adjustable therein by reason of its threaded head portion 332 being engaged in an enlarged recess formed in the bore 321. Thus, the upper limit of travel of the piston 278 may be established by axially adjusting the positive stop 331 within the bore 321.

The cap 280 is also supplied with an auxiliary fluid supply circuit by means of which the initial supply of fluid pressure to the chamber 288 for effecting downward movement of the piston 278 may be supplied. This auxiliary circuit comprises a passage 336 which communicates with the bore 321 and with a radially extending chamber 337 formed in the cap 280. A passage 338 is provided in the hub portion 284 of the cap 280 and has communication with the chamber 337 and the chamber 288. The passage 336 is normally closed by a ball 339 that is urged inwardly into sealing engagement with the opening of the passage 336 by a spring 340 that is compressed within the chamber 337 by a screw 341 which is threadedly engaged in an enlarged opening provided with the outer end of the chamber 337. With the pin 323 engaged within the bore 321 the fluid pressure supplied to the bore 321 via the port 322, shown in FIGS. 2 and 10, and diagrammatically in FIG. 23, will flow from the bore 321 into the passage 336. Since the pressure of the fluid being supplied is greater than the pressure that is exerted by the spring 340, the ball 339 will unseat to open the passage 336, so that the fluid pressure will flow into the chamber 337 and thence into the passage 338 to enter the chamber 288 to effect an initial downward movement of the piston 278.

In order to condition the electrical circuit for succeeding steps in the cycle, a pair of limit switches 343 and 344 are provided to be actuated by the movement of the piston 278 as shown in FIGS. 2, 6 and 9. The limit switches 343 and 344 are located within a switch compartment 345 which is integrally formed with the motor housing 240. The compartment 345 is provided with a removable cover 346, as shown in FIG. 6, for gaining access to the limit switches contained within the compartment. The limit switches 343 and 344 are actuated by a dog 347 that is secured to the side of the piston 278. When the piston 278 is in its uppermost position, as shown in FIGS. 2 and 7, wherein the tool change arm 75 is in its parked position, the dog 347 is disposed to engage the extending end of a plunger 348 to shift the plunger axially for actuating the limit switch 343. To this end, the plunger 348 is disposed within a suitable opening formed in a wall of the compartment 345 and is arranged to extend inwardly into the path of travel of the dog 347. As the dog 347 moves the plunger 348 the latter engages the plunger 349 of the limit switch 343 to actuate the limit switch and thereby indicate that the tool change arm 75 is in its parked position.

On the other hand when the piston 278 has been moved downwardly its full limit of travel to thereby move the tool change arm 75 from its parked position to its operating position, the dog 347 will engage another plunger 350 which is, likewise, slidably contained in a suitable opening formed in the side wall of the compartment 345 and extends into the path of travel of the dog 347. With the piston 278 in its lowermost position the dog 347 will engage the plunger 350 to move it inwardly for moving the plunger 351 of the limit switch 344 to actuate the latter and indicate in the electrical control system that the tool change arm 75 is in the operating position.

The rotational movement of the tool change arm 75 for completing a tool changing operation is produced by rotating the coaxially disposed shaft 155 as previously mentioned. To this end the shaft 155 extends rearwardly and outwardly of the tubular parking shaft 152, as shown in FIG. 6. The extreme rearward end portion 354 of the shaft 155 is in splined engagement with internal splines formed in a bore of a gear 355. The gear 355 is located within a bore 352 of a boss 356 formed integrally with the housing 240. The gear 355 is provided with an elongated hub 353 that is journaled in an anti-friction bearing 357 which is mounted in an enlargement 358 of the bore 352, as shown in FIG. 6. Thus, the antifriction bearing 357 rotatably supports the rearwardly extending end of the shaft 155 as well as the gear 355. A spacer ring 359 is mounted on the shaft 155 and disposed between the anti-friction bearing 357 and the hub 269 of the bell crank 270 and is arranged so that one face thereof engages the inwardly disposed face of the inner race of the bearing 357. An annular shoulder formed on the opposite face of the spacer ring engages the face of the hub 269 of the bell crank 270. The spacer ring 359 serves to maintain the bearing 357 within the enlargement 358 and also to maintain the hub 269 of the bell crank 270 in proper splined engagement with the end of the tubular parking shaft 152.

The bore 352 of the boss 356 is closed by means of a plug 360 that has an axially extending hub 361 which is disposed to engage the end of the gear 355 for preventing it from shifting axially on the shaft 155. The plug 360 is maintained in position within the bore 352 by a snap ring 362. The bore 352 of the boss 356 has communication with a transverse bore 366 of the cylinder 241, as shown in FIGS. 6, 8 and 9, the gear 355 is in meshing engagement with a gear rack 367 formed on a plunger 368 reciprocally disposed within the bore 366 of the cylinder 241. Axial movement of the plunger 368 will therefore cause a rotational movement of the gear 355 and its cooperating shaft 155 which, in turn, effects rotational movement of the tool change arm 75, as previously mentioned.

The plunger 368 is slidably carried within the bore 366 formed in the vertical cylinder 241 and is actuated in a downward direction by a hydraulic actuating mechanism, generally identified by the reference numeral 370, and, which is contained in the vertical cylinder 241 above the plunger 368. An identical hydraulic actuating mechanism 371 is contained in the opposite lower end of the vertical cylinder 241 beneath the plunger 368 for the purpose of actuating the plunger 368 in an upward direction.

The hydraulic actuating mechanism 370 comprises a cylinder head 372 having an axial bore 373. The cylinder head 372 is disposed on the upper end of the cylinder 241 and is orientated with respect to the bore 366 of the cylinder 241 by a hub 374 that extends axially from the head 372 into the bore 36. A sleeve 375 having one end disposed in the bore 373 of the cylinder head 372 is secured therein by means of a snap ring 378. The sleeve 375 extends concentrically from the bore 373 into the upper portion of the bore 366 of the vertical cylinder 241. A cap 376 is provided for closing the upper end of the vertical cylinder, as shown in FIG. 8, being secured in position by screws 377. A plunger 380 is slidably carried within the bore of the sleeve 375 and is adapted to be shifted therein by hydraulic pressure.

The outer wall of the sleeve 375 and the inner wall of the upper portion of the vertical cylinder 241 define an annular passage for slidably receiving a piston sleeve 381 which is likewise disposed or adapted to be shifted therein by hydraulic pressure. A radial inwardly extending flange 382 is formed on the upper end of the piston sleeve 381. The lower end of the piston sleeve 381 is disposed to engage the upper axial end face of the plunger 368 so that pressure supplied to a chamber 383 via a port 384 provided in the wall of the upper end of cylinder 241 will operate to move the sleeve 381 downwardly and thereby effect downward movement of the plunger 368. The inwardly extending flanged head 382 of the piston sleeve 381 is adapted to engage a radial outwardly extending flange 385 formed on the lower end of the cylinder sleeve 375 which serves as a positive stop to limit the downward movement of the piston sleeve 381. A spacing sleeve 386 is loosely mounted around the cylinder sleeve 375 within the annular passage 383 that contains the piston sleeve 381. It is disposed above the head portion 382 of the piston sleeve 381 and operates to define the uppermost limit of travel of the piston sleeve 381.

A port 387 formed in the cylinder head 372 is in communication with an annular groove 388 formed in the interior surface of the bore of the cylinder head 372. The annular groove 388 serves as a fluid distribution channel for admitting pressure to and exhausting pressure from a chamber 389 at the upper end of the plunger 380 and which has communication with the annular groove 388 by means of a plurality of radial ports 390 formed in the upper end of the sleeve 375. The port 387 is suitably connected to a hydraulic circuit to be subsequently described, for admitting fluid pressure to and exhausting fluid from the chamber 389.

The hydraulic actuating mechanism 371 is located in the opposite end of the vertical cylinder 241 and is identical in construction and arrangement to the hydraulic actuating mechanism 370. It includes a cylinder head 396 and a cap 397 for closing the lower end of the cylinder 241. A cylinder sleeve 398 is attached to the cylinder head 396 and extends axially therefrom into the lower portion of the bore 366 of the cylinder 241 for slidably receiving a plunger 399. A piston sleeve 401 is slidably contained within a passage formed between the outer wall of the cylinder sleeve 398 and the inner wall of the bore 366 in the lower portion of the vertical cylinder 241. The lower limit of movement of the piston sleeve 401 is determined by a spacer sleeve 402 which is loosely mounted about the cylinder sleeve 398 and is disposed between the axially extending hub of the cylinder head 396 and the head portion 403 of the piston sleeve 401. The upper limit of travel of the piston sleeve 401 is established by an outwardly extending annular flange portion 404 formed on the cylinder sleeve 398 and which is adapted to be engaged by the shoulder formed by the head portion 403 on the piston sleeve 401. A port 406 formed in the wall of the lower portion of the vertical cylinder 241 serves to carry fluid to and from an annular chamber 407 defined by the outer peripheral surface of the cylinder sleeve 398 and the inner wall of the vertical cylinder 241. A port 408 which communicates with an annular groove 409 constructed in the inner wall of the bore of the cylinder head 396. The groove 409 serves as a distribution channel for supplying or carrying fluid to and from a chamber 410. Communication between the distribution channel 409 and the chamber 410 is established by means of a plurality of radial ports 411 constructed in the cylinder sleeve 398. The port 408 carries a flow of fluid to and from the chamber 410 for actuating the plunger 399 in its axial movement.

The tool change arm 75 is required to be located in four rotary positions, and the plunger 368 must, therefore, likewise be located in four specific positions within the bore 366. Each of the four plunger positions is established by actuating the piston sleeves 381 and 401, and the plungers 380 and 399 in various combinations. Four notches 416 to 419, inclusive, are formed in the periphery of the plunger 368 on the side of the plunger, as shown in FIGS. 6 and 9. The four notches 416 to 419, inclusive, cooperate with a resiliently biased detent mechanism generally identified by the reference numeral 420, as shown in FIG. 6, to yieldably retain the plunger 368 in one or the other of its four positions.

The operation of the hydraulic actuating mechanisms 370 and 371 to establish the four positions of the plunger 368 is best shown diagrammatically in FIGS. 16 to 22, inclusive, with the corresponding rotary position of the tool change arm 75 being shown in FIGS. 16A to 22A, inclusive, directly above the corresponding diagrammatic views of the hydraulic actuating mechanisms 370 and 371. In FIGS. 16 to 22, inclusive, the direction of the arrows at the ports 387, 384, 406 and 408 indicate the direction of flow of fluid into and out of the mechanisms. Thus, as illustrated in FIG. 16, the arrow directed away from the port 384 indicates that the chamber 383 is connected to the reservoir and that the chamber is being vacated of fluid. In like manner, the arrow directed away from the port 387 indicates that the port 387 is connected to the reservoir and that the fluid in the chamber 389 has been exhausted therefrom. In a similar manner, the arrow directed away from port 406 indicates that the port is connected to the reservoir and that fluid in the chamber 407 has been exhausted out of the chamber to the reservoir. On the other hand, the arrow directed into the port 408 indicates that the port is connected to a source of fluid pressure which is being directed into the chamber 410 for actuating the plunger 399.

FIG. 16 illustrates a condition of the hydraulic actuating mechanisms 370 and 371 with the corresponding position of the tool change arm 75 being depicted in FIG. 16A, the arm having been moved from its parked position to its operating position by rotation of the parking shaft 152 through the operation of the piston 278. To achieve this positioning of the tool change arm 75, hydraulic pressure is directed into the port 408 for actuating the plunger 399 and the other three ports are connected to exhaust. As a result, the force applied to the plunger 399 serves to move the plunger 368 to its uppermost limit of movement so that the detent mechanism 420 engages the notch 419. As the plunger 368 is moved upwardly, it moves the piston sleeve 381 with it to its uppermost limit within its cooperating annular passage 383.

With the tool change arm 75 moved into its operating position and located in the rotary position illustrated in FIG. 16A, it is necessary to rotate the arm 75 in a clockwise direction, as viewed in FIG. 16A, and indicated by an arrow 423 to move the tool grip 74 into engagement with the tool 65 in a tool storage socket 91 and the tool grip 76 into an engagement with the tool 65 in the spindle 62 as depicted in FIG. 17A. To obtain this rotation of the tool change arm 75 from its position, as shown in FIG. 16A, to the position shown in FIG. 17A, it is necessary to move the plunger 368 downwardly so that the detent mechanism 420 will move out of engagement with the notch 419 into engagement with the notch 418.

Such downward movement of the plunger 368 is effected by merely connecting the two ports 384 and 406 to the source of fluid pressure, as indicated in FIG. 17. At this time, the port 387 will be connected to exhaust and the port 408 will continue to be connected to the source of fluid pressure. Under these conditions, the piston sleeve 401 will be moved upwardly into engagement with the radial flange 404 of the cylindrical sleeve 398 but the piston sleeve will move relative to the plunger 399 without having any effect on the plunger 368 since it was not in engagement with the end of the plunger 368.

On the other hand, fluid pressure into the port 384 will cause a downward movement of the piston sleeve 381 until it engages the stop flange 385 of the cylindrical sleeve 375. Since the plunger 368 is being forced against the piston sleeve 381 by the action of the plunger 399, the plunger 368 will move downwardly with the sleeve 381 and the notch 418 will move into engagement with the detent mechanism 420.

It will be noted that in forcing the plunger 368 downwardly, the piston sleeve 381 will be operating against the pressure exerted against the plunger 368 in the opposite direction by the plunger 399. However, the annular area of the head 382 of the piston sleeve 381 upon which the hydraulic pressure is actuating is greater than the area of the end of the plunger 399 upon which the pressure from the port 408 is acting so that the force exerted by the sleeve 381 will overcome the force exerted by the plunger 399 to effect the downward movement of the plunger 368. With the plunger 368 thus positioned, the arm 75 will be located as depicted in FIG. 17A with the grips 74 and 76 in engagement with the tools 65 in a tool storage socket 91 and in the spindle 62, respectively.

After the tool grips 74 and 76 have engaged the two tools 65, the tool change arm 75 is extended by operation of the quill 126 in the manner previously described to withdraw the tools 65 from the spindle 62 and from the tool storage socket 91, respectively. When the tools 65 have been withdrawn it is necessary to rotate the tool change arm 75 through an angle of 180° in a clockwise direction as indicated by an arrow 424 in FIG. 17A, from the position shown in FIG. 17A to the position depicted in FIG. 18A to exchange the positions of the two tools in the grips 74 and 76. To produce this 180° of rotary movement of the tool change arm 75, the plunger 368 must be shifted to its downward limit of movements so that the detent mechanism 420 engages the notch 416. This position is shown in FIG. 18, the plunger 368, having been shifted to this position from the position illustrated in FIG. 17. It is apparent that at this time the downward movement of the plunger 368 can only be achieved by directing pressure to the plunger 380. This is true by reason of the piston sleeve 381 having been shifted to its lower limit of movement against the stop flange 385 of the cylindrical sleeve 375, as previously described, to achieve the position of the plunger 368, as illustrated in FIG. 17. Therefore, further downward movement of the plunger 368 is produced by directing fluid pressure into the port 387 for actuating the plunger 380 in its downward direction. The other three ports 384, 406 and 408, are connected to exhaust as indicated by the arrows. In view of this hydraulic connection to exhaust, the plunger 399 and the piston sleeve 401 are free to move downwardly in response to the force applied by the plunger 380. The plunger 368 then assumes the position shown in FIG. 18 with its lower end bearing against the piston sleeve 401 and moves its notch 416 into engagement with the detent mechanism 420. Such movement of the plunger 368 from the position shown in FIG. 17 to the position illustrated in FIG. 18 causes 180° of rotation of the tool change arm 75 to exchange the position of the tool grips 74 and 76 as indicated in FIG. 18A. After such rotational movement has taken place, the tool change arm 75 may be retracted towards the spindle head 60 for the purpose of inserting the tools 65 into the spindle 62 for the tool storage socket 91 with a new tool being placed in the spindle and the tool that previously operated with the spindle being inserted in the storage socket 91 at the tool change station.

With a tool change accomplished, it is now necessary to rotate the tool change arm 75 in the opposite or counterclockwise direction as indicated by an arrow 425 in FIG. 18A to move the tool grips 74 and 76 out of engagement with the tools 65 and relocate the tool change arm 75 in a start position, as illustrated in FIG. 19A. It will be noted in comparing the position of the tool change arm 75 shown in FIG. 19A, with the position of the tool change arm 75 shown in FIG. 16A, that the second start position of the tool change arm is reversed 180° from the position shown in FIG. 16A. In FIG. 16A the tool change arm is in its first start position and is located so that the tool grip 74 is at the top while the tool grip 76 is at the bottom. In FIG. 19A, the tool change arm 75 is shown in its second start position with the tool grip 76 at the top and the tool grip 74 located at the bottom.

To obtain rotation of the tool change arm 75 in a counterclockwise direction from the position shown in FIG. 18A to the position shown in FIG. 19A, the plunger 368 must be moved upwardly so that its notch 417 moves into engagement with the detent 420. To accomplish this movement it is necessary to disconnect the ports 384 and 406 from exhaust and connect them to the source of fluid pressure as indicated in FIG. 19. The fluid pressure continues to be directed into the port 387 while the port 408 continues to be connected to exhaust, as indicated by the arrows. The fluid pressure to the chamber 383 via the port 384 will have no effect on the piston sleeve 381 since it is already in its lower position against the stop flange 385 of the cylindrical sleeve 375 as shown in FIG. 18. Also, as shown in FIG. 18, the piston sleeve 401 and the plunger 399 are at their lower limits of movement. Therefore, with the piston sleeve 381, the plunger 380, the piston sleeve 401, the plunger 399 and the plunger 368 located in the positions shown in FIG. 18, the fluid pressure directed into the port 406 serves to move the piston sleeve 401 upwardly to its upper limit of movement against the stop flange 404 of the cylindrical sleeve 398. This upward movement of the piston sleeve 401 will effect a like movement of the plunger 368 since it was in engagement with the piston sleeve 401 when the sleeve 401 was in its lowermost position and such movement of the plunger 368 will move its notch 417 into engagement with the detent 420. This movement occurs because the area of the annular end of the piston sleeve 401 is greater than the end area of the plunger 380 so that the pressure acting on the end of the sleeve 401 overcomes the pressure acting on the end of the plunger 380 and forces the plunger 368 upwardly. This upward movement of the plunger 368 will continue until the plunger 368 engages the end of the sleeve 381. When this occurs the combined pressures acting on the ends of the sleeve 381 and the plunger 380 will then be greater than the pressure acting on the end of the sleeve 401 and upward movement of the plunger 368 will stop. The axial upward movement of the plunger 368 to move the notch 416 out of engagement with the detent 420 and the notch 417 into engagement with the detent 420 will cause a rotation of the tool change arm 75 in a counterclockwise direction to its second start position, as illustrated in FIG. 19A.

A tool change has now been completed and the tool change arm 75 will be moved from its operating position to its parked position wherein it will be positioned as depicted in FIG. 5, to permit a machining operation to be performed. It will be noted that after one complete tool change, the tool change arm 75 is displaced 180° from the position which it was in when the tool change was first initiated. Thus, the tool change arm 75 is shown in FIG. 19A as being displaced 180° from the position shown in FIG. 16A when the tool change was being initiated and the tool grip 74 is now in its lower position rather than in the upper position as shown in FIG. 16A. With the tool change arm 75 positioned in its second start position, as shown in FIG. 19A, only one-half of the cycle of the hydraulic actuating mechanisms 370 and 371 has occurred and the full cycle will not have been completed until two tool changes have been effected. The second tool change will be initiated when the tool change arm 75 is moved from its parked position, as shown in FIG. 5, to its operating position, as shown in FIG. 4, with the tool change arm 75 being located as shown in FIG. 19A. The hydraulic actuating mechanisms 370 and 371 will then be operated in the manner previously described to obtain the conditions shown in FIGS. 20 to 22, inclusive, for completing the second tool change. Upon completion of the second tool change, the hydraulic actuating mechanisms 370 and 371 will be in the condition shown in FIG. 22 which is identical to the condition depicted in FIG. 16. In like manner, the tool change arm 75 will be in the first start position, as shown in FIG. 22A, with the tool grip 74 in the upper location in the identical manner, as shown in FIG. 16A. Thus, the rotary movement of the tool change arm 75 by operation of the plunger 368 in combination with the axial movement of the arm 75 by operation of the quill 126 will serve to remove the tool 65 from the spindle 62 and replace the tool with another tool 65 that was withdrawn from the tool storage socket 91 in the magazine 70 and the tool 65 that was removed from the spindle will be inserted into the storage socket 91 that previously carried the tool 65 which was inserted into the spindle 62.

Each complete movement of the tool change arm 75 must be indicated in the electrical control system to condition it for the succeeding step in the cycle. As previously mentioned, the limit switches 179 and 180 are actuated by the retraction and extension of the quill 126 to condition the electrical control system after the extended and retracted positions of the tool change arm 75 have been established by the axial movement of the quill 126. The completion of each rotary movement of the tool change arm 75 is indicated in the electrical control system by three limit switches 430, 431 and 432, that are shown in FIGS. 8 and 9, and which are mounted within the switch compartment 345 of the housing 240.

The three limit switches 430, 431 and 432 are controlled by cams or dogs 433, 434, 435 and 436 that are carried on the peripheral surface of the plunger 368 diametrically opposite the rack 367 formed thereon. The arrangement for the cam or dog 433 is shown in FIG. 8 wherein the dog 433 is relatively long, the length thereof being substantially equal to the length of the rack 367 while the dogs 434 to 436, inclusive, shown in FIG. 9, are relatively short and are disposed at the side of the long dog 433. With this arrangement, the relatively long dog 433 will actuate the limit switch 431 whenever the plunger 368 is either of its two upper positions, when either of the notches 418 or 419 are engaged by the detent 420. When the plunger 368 is in its uppermost position so that the notch 419 receives the detent 420, the dog 434 is arranged to actuate the limit switch 430 so that both the limit switches 431 and 430 are actuated when the plunger 368 is in its uppermost position. On the other hand, when the plunger 368 is moved to its second position wherein the detent 420 engages the notch 418, the relatively long dog 433 will actuate the limit switch 431 while the dog 435 will be disposed to actuate the limit switch 432 so that when the plunger 368 is in its second position the limit switches 431 and 432 are actuated.

When the plunger 368 is in its third position wherein the notch 416 is engaged by the detent 420, the relatively long dog 433 will be moved out of engagement with the limit switch 431 and the dog 436 will be disposed to actuate the limit switch 432. Thus, with the plunger 368 in its third position only the limit switch 432 is actuated. When the plunger 368 is in its fourth position wherein the notch 417 is engaged by the detent 420, the relatively long dog 433 is positioned so as not to engage limit switch 431 while the dog 435 is positioned to actuate the limit switch 430. It is therefore apparent that when the plunger 368 is in one or the other of its two upper positions, the limit switch 431 will be actuated in combination with either the limit switch 430 or the limit switch 432. When the plunger 368 is in either one of its two lower positions, the limit switch 431 is deactuated and one or the other of the limit switches 430 or 432 is actuated.

FIGS. 16B to 22B inclusive, illustrate diagrammatically the position of the dogs 433, 434, 435 and 436 for the corresponding rotary position of the tool change arm 75 as depicted in FIGS. 16A to 22A, respectively. Each of the FIGS. 16B to 22B inclusive, depicts the position of the dogs 433 to 436 inclusive, as effected by axial movement of the plunger 368 and which corresponds with the rotary position of the tool change arm 75, as shown in the views directly beneath in FIGS. 16A to 22A inclusive. The diagrammatic views in 16B to 22B inclusive, also indicate the condition of the switches 430, 431 and 432 for each rotary position of the tool change arm 75 by showing the particular associated dog engaging the actuating plunger of the associated limit switch.

The construction of the tool change arm 75 is illustrated in FIGS. 3, 11 and 14. The tool grips 74 and 76 of the tool change arm 75 are identical and a description of the tool grip 76 will apply to the tool grip 74. As previously mentioned, the rollers 79 are operable to retain a tool within the associated grips 74 and 76. Thus, the rollers must be retractable to allow the tool to enter into the grips and thereafter the rollers must move back into their restricting position as shown. To this end, the pair of rollers 79 is rotatably supported on the end of a bracket 441. The opposite end of the bracket 441 is bifurcated, as shown in FIG. 14, and is disposed to straddle a central portion 442 of the grip 76. A dowel 443 carried by the central portion 442 of the grip engages suitable openings provided in the bifurcated end of the bracket for supporting the bracket for pivotal movement. Thus, pivotal movement of the bracket 441 in a counterclockwise direction, as viewed in FIG. 11, will locate the rollers 79 in a restricting position relative to the surface 77 of the grip. The bracket 441 and the roller 79 are maintained in operative position by means of side plates 461 and 462 which are secured to the grip on each side of the central portion 442. In FIG. 11, the lower tool grip 76 is shown without the side plates, while the upper grip 74 is shown with the side plates in place. The bracket 441 is urged in the counterclockwise direction, as viewed in FIG. 11, by a plunger 444 that is carried in a bore 446 formed in the body of the tool arm. One end of the plunger 446 engages a plug 447 that is provided on the side of the bracket 441. The plunger 444 is urged into engagement with the associated bracket 441 by means of a compression spring 448 which is disposed within the bore 446 in engagement with the inner end of the plunger and the blind end of the bore 446. The rearward portion of the bore in which the spring 448 is disposed also serves as a fluid chamber, and to prevent the leakage of fluid around the plunger 444, a seal 449 is provided.

The force exerted by the spring 448 is transmitted through the plunger 444 to normally urge the bracket 441 in a counterclockwise direction, as viewed in FIG. 11, to move the rollers 79 in the same direction so that they extend beyond the arcuate surface 77 into the path of travel of the collar 78 of a tool 65 as it passes into the tool grip 76. As the collar of the tool 65 passes into the semicircular surface 77, the rollers 79 are forced inwardly in a clockwise direction against the pressure of the spring 448. When the collar 78 of the tool is located within the semicircular surface 77, the diameter of the collar is past the rollers 79 to allow them to move outwardly beyond the semicircular surface 77 for the purpose of retaining the tool 65 within the grip 76.

It will be recalled that when the tool change arm 75 is in its extended position it is rotated through an angle of 180° to interchange the position of the two tools 65 in the grips 74 and 76. This rotational movement of the tool change arm 75, while carrying two tools 65 in the grips 74 and 76, occurs only when the tool change arm 75 is in its extended position. The rate of rotation of the tool change arm 75 when performing this function of interchanging positions of the two tools 65 in its grips, occurs at a relatively rapid rate and it is possible that when the tool arm stops after this rotation, the inertia of the tools 65 in the grips may overcome the pressure of the springs 448 so that the rollers 79 will fail to hold the tools 65 within the grips. To insure that such accidental displacement of the two tools from the grips of the tool change arm 75 does not occur there is provided a hydraulic circuit for locking the plungers 444 in their outermost position thereby locking each pair of rollers 79 in engagement with the collars of the tools 65 which are within the grips 74 and 76.

To this end, passages 450 and 451 are formed in the body of the arm 75 with each passage communicating with its associated bore 446. The axial passages 450 and 451 also communicate with an annular groove 452 formed on the peripheral tapered surface of the shaft 193 and which serves as a distribution groove for distributing fluid pressure to the passages 450 and 451. A transverse passage 453 is formed in the tapered portion of the shaft 193 to communicate with the groove 452 and with an axially extending passage 454 formed in the shaft 193. The passage 454 extends from the transverse passage 453 to another transverse passage 456 formed in the shaft 193 at a reduced diameter portion 457. The reduced diameter portion 457 of the shaft 193 forms an annular chamber 458 with which both ends of the transverse passage 456 communicate. This annular chamber 458 serves to supply fluid pressure to the transverse passage 456 in any angular position of the shaft 193. Fluid pressure is supplied to the chamber 458 via a port 459 formed in the hub 191. The port 459 is connected to a source of fluid pressure which is operable to supply fluid pressure whenever the tools 65 are to be locked within the grips 74 and 76. When the tool change arm 75 is to be disengaged from the tools, the port 459 is connected to the fluid reservoir so that there is no pressure acting on the plungers 444, and the rollers may be moved inwardly against the pressure of the springs. The control circuit for effecting the locking and unlocking of the tool grips will be described in conjunction with the hydraulic circuit.

The simplified tool change arm 75 insures positive retention of the tools 65 in the grips 74 and 76 by reason of the rollers 79 being hydraulically locked in engagement with the collars of the tools while the tool change arm 75 is rotating. As a result, the rate of the rotational movement of the tool change arm in interchanging the position of the tools need not be restricted because the tools cannot be dislodged from the grips by the inertia of the tools developed during the rotational movement of the tool change arm 75.

The spindle 62 is provided with a collet 470, shown in FIG. 23, for automatically locking a tool in the spindle for performing a work operation, upon the insertion of the tool into the spindle by the tool change arm. The collet is also operated automatically for effecting the release of the tool after the completion of a machining operation so that the tool change arm may withdraw the tool from the spindle and insert a new tool therein. The spindle 62 is illustrated diagrammatically in FIG. 23 of the hydraulic circuit. It is journaled in the spindle head 60, as previously mentioned, and is provided with a gear 465 that is connected to a source of power 466 through a transmission 507, in a well known manner, to rotate the spindle at a variety of speeds selectively. For a more detailed description of the spindle and the collet 470 contained therein, reference may be made to the aforementioned U.S. Patent No. 3,052,011. The spindle 62 contains the collet 470 for receiving the shank of the tool 65 and is arranged so that it may be actuated, in a well known manner, for locking the tool 65 to the spindle 62. Such actuation of the collet 470 for locking the tool 65 therein is achieved by drawing the collet 470 rearwardly to move it into gripping engagement about the shank of the tool 65. To release the tool, of course, the collet 470 is permitted to move forwardly a slight amount to relieve the pressure on the shank of the tool 65 for releasing the tool and permitting it to be withdrawn from the spindle 62. The collet 470 includes a draw bar 467 which is disposed within the spindle 62 and serves to transmit the force which moves the collet 470 axially for releasing and clamping the tools 65 to the spindle 62. To this end, the draw bar 467 extends rearwardly beyond the gear 465 as shown diagrammatically in FIG. 23. The draw bar 467 is yieldably urged rearwardly of the spindle 62 by a spring 468 which has one end bearing against the rearmost end of the spindle 62 while its other end bears against a collar or piston 469 so that it normally urges the draw bar 467 rearwardly of the spindle 62. This force in the rearward direction applied by the spring 468 to the collet 470 through the draw bar 467 serves to draw the collet into tight engagement with the shank of a tool 65 for clamping the tool to the spindle 62.

A forward movement of the collet 470 serves to release its tight engagement with the shank portion of the tool 65 in the spindle 62. This is accomplished by an axial force applied to the draw bar 467 through the piston 469 which is actuated by hydraulic pressure admitted through a port 471 into a chamber 472 of a cylinder 473. The hydraulic pressure acts against the end of the piston 469 to force it forwardly and move it against the pressure of the spring 468. This forward movement of the piston 469 compresses the spring 468 and affects the slight forward shifting of the collet 470 for releasing the tool 65. When the hydraulic pressure is withdrawn from the chamber 472, the piston 469 and the associated draw bar 467 will be urged rearwardly from the spindle 62 by the force of the spring 468. Thus, the withdrawal of hydraulic pressure from the chamber 472 will actuate the collet 470 into clamping engagement with the shank of the tool to lock the tool to the spindle 62.

The rearward movement of the piston 469 by the spring 468 serves the further purpose of actuating a limit switch 475 to indicate in the electrical control system that the collet 470 is in its clamping position and a machining operation may be performed. In order to actuate the limit switch 475, the piston 469 is provided with a rearwardly extending rod 476 that extends through the end of the cylinder 473. The extending end of the rod 476 is provided with a dog 477 which is disposed to actuate the plunger of the limit switch 475 whenever the piston 469 is in its rearmost position. When hydraulic fluid is supplied to the chamber 472, the piston 469 moves forwardly towards the spindle 62 and the rod 476 will move with it thereby moving the dog 477 out of engagement with the plunger of the limit switch 475. The limit switch is therefore released so that it will indicate in the electrical control system that the collet 470 is in a released position and a tool may be removed from the spindle 62.

The hydraulic circuit for driving the various components described is illustrated diagrammatically in FIG. 23 and comprises a pump 490 connected to draw hydraulic fluid from a reservoir 491. The output of the pump 490 is discharged into a pressure line 492 and a branch pressure line 493, with the exhaust fluid being carried back to the reservoir by a pair of return lines 494 and 495. The cross feeding movement of the spindle head 60 for feeding the spindle 62 towards and away from the workpiece is effected by a hydraulic motor 501 which is actuated by hydraulic pressure from the line 492 under the control of a hydraulic servo valve 502 that may be operated automatically in response to recorded data or by the manual manipulation of the electrical control circuit for controlling the rate and directional rotation of the cross feed motor 501 to regulate the rate and direction of movement of the spindle head 60.

The spindle 62 is driven in its rotary movement by a hydraulic motor 466 under the control of another hydraulic servo valve 506 that is likewise controlled automatically either from recorded data or by the manual manipulation of the electrical control system. The hydraulic motor 466 is connected to drive the gear 465 and its associated spindle 62 through a range change transmission 507 which is illustrated diagrammatically in the hydraulic diagram of FIG. 23. This drive connection in combination with the infinitely variable speed obtainable from the motor 466 provides a wide range of spindle speeds.

Hydraulic pressure from the line 492 is also directed selectively to the cylinder 473 for actuating the piston 469 to compress the spring 468 for shifting the collet 470 forwardly for releasing the tool in the spindle 62. The flow of hydraulic pressure to the cylinder 473 is under the control of a valve 509 which is normally positioned to connect the cylinder 473 to the return line 494 so that the spring 468 expands and draws the collet 470 into clamping position for retaining the tool in the spindle 62. When it is desired to release the tool in the spindle 62, a solenoid coil 510 may be energized to actuate the valve 509 which is then operative to connect the pressure line 492 to the cylinder 473 for actuating the piston 469 to compress the spring 468 and release the tool within the collet 470.

The piston 129 and its associated quill 126 for extending and retracting the tool change arm 75 is under the control of a pair of directional valves 514 and 515 which normally connect the chambers 173 and 171 to the return line 494 as shown in FIG. 23. The valve 514 may be actuated by energizing its solenoid coil 516 while the valve 515 may be actuated by energizing its solenoid coil 517. Energization of the solenoid coil 516 will actuate the valve 514 to connect the chamber 173 to the pressure line 492 to move the quill 126 in a leftward direction, as viewed in FIG. 23, or to the right, as viewed in FIG. 2, for retracting the tool change arm 75. On the other hand, energization of the solenoid coil 517 will actuate the valve 515 to connect the chamber 171 to the pressure line 492 for actuating the associated quill 126 in a direction to extend the tool change arm 75. A throttle valve 518 is connected in a return line 519 that carries exhaust pressure from the chamber 173 to the return line 494 so that the rate of extension of the tool change arm 75 may be regulated. In like manner, a throttle valve 520 is connected in a return line 521 which carries exhaust pressure from the chamber 171 to the return line 494 so that the rate of retraction of the tool change arm 75 is regulated by the setting of the valve 520.

Operation of the motor 86 for rotating the tool carrying ring 81 to move the tool storage sockets 91 in their circular path of travel is under the control of a pair of directional valves 527 and 528. Both of these valves are normally positioned to connect both sides of the motor 86 to the return line 494. The valve 528 may be actuated by energizing a solenoid coil 529 which will serve to connect a port of the motor 86 to the pressure line 492 for actuating the motor 86 to rotate the ring 81 in a reverse direction. When the valve 528 is actuated, the exhaust from the motor 86 will flow through a line 530 and will by-pass a check valve 531 to flow through a throttle valve 532 that is set to establish a slow rate of rotation of the motor 86 so that the tool carrying ring 81 will be driven in a reverse direction at a creep rate for the purpose of positioning the selected tool storage socket at the tool change station 88. The exhaust fluid will flow from the throttle valve 532 through a line 533 and through the valve 527 to the return line 494, since the valve 527 is in its normal position.

To effect forward rotation of the tool carrying ring 81 for selecting a desired tool 65 in one of the tool storage sockets 91, the solenoid 529 of the valve 528 is deenergized to place the valve in its normal position for connecting the port of the motor to the return line 494. The valve 527 is actuated by energizing a solenoid coil 534 to direct hydraulic pressure from the pressure line 492 to another port of motor 86 for driving it in a forward direction. The pressure will flow through the valve 527 into the line 533 and through the check valve 531 to the line 530 connected to the motor 86. The exhaust fluid will flow through a line 535 connected to the other port of the motor 86 and will flow through a throttle valve 536 that is connected in the circuit in a manner to by-pass a check valve 537. The throttle valve 536 operates to establish the forward rate of rotation of the motor 86. The exhaust fluid will then flow through a line 538 and through the valve 528, which is in its normal position, to the return line 494 to return to the reservoir 491.

The hydraulic pressure in the line 533 for driving the tool carrying ring 81 in a forward direction also flows into a connected branch line 542 to a cylinder 104 for actuating a plunger 107 to pivot a rocker arm 101 upwardly against the pressure of a spring 103 so that it does not contact the plunger 102 of the limit switch 95. During the reverse rotation of the motor 86 and the tool carrying ring 81, pressure is not directed into the line 542 so that the plunger 107 is released and the spring 103 forces the rocker arm 101 downwardly in its pivotal movement against the positioning mechanism, represented by the block 541. The mechanism 541 is associated with the motor 86 and is operative to prevent the rocker arm 101 from engaging the plunger 102 of the limit switch 95 until proper positioning of the selected tool storage socket 91 at the tool change station has been effected by the motor 86. The reverse rotation of the tool carrying ring 81 will then continue, as previously described, until the positioning mechanism 541 associated with the motor 86 releases the arm 101 when the ring is positioned to accurately locate the selected tool at the tool change station. When this occurs the rocker arm 101 will move downwardly under the pressure of the spring 103 to contact the plunger 102 of the limit switch 95 for stopping the operation of the motor 86. The selected tool storage socket 91 will then be accurately located at the tool change station 88.

As previously described, the rotary movement of the tool change arm 75 is effected by the hydraulic actuating mechanisms 370 and 371. The flow of hydraulic pressure to and from the plungers 380 and 399 and the piston sleeves 381 and 401 is controlled by three directional valves 543, 544 and 545. The fluid pressure from the pump 490 is carried to the valves 543 and 545 by the branch presure lines 493 that receives pressure from the pressure line 492, and to the valve 544 by the pressure line 492.

The valve 543 controls the operation of the piston sleeves 381 and 401, and is connected to the chambers 383 and 407 by a line 546 and a line 547 which are connected to the ports 384 and 406 respectively. In its normal position, the valve 543 connects the chambers 383 and 407 to the return line 495 so that the piston sleeves are freely movable in either direction. However, the valve 543 may be actuated by energizing a solenoid coil 549, which conditions the valve 543 to connect the chambers 383 and 407 with the pressure branch line 493 so that both of the piston sleeves are simultaneously actuated to their inner position against the stop flanges 385 and 404 of the cylinder sleeves 375 and 398, respectively.

The plungers 380 and 399 are actuated individually and selectively by the operation of the valves 544 and 545, respectively. The valve 544 is connected to the chamber 389 by a line 550 and normally connects the chamber to the return line 494 so that fluid pressure is not applied to the plunger 380. However, the valve 544 may be actuated by energizing a solenoid coil 551 which positions the valve to connect the pressure line 492 to the line 550 for directing fluid pressure to the chamber 389 to actuate the plunger 380 for shifting the plunger 368 in the manner previously described.

In like manner, when the valve 545 is in its normal position it connects the chamber 410 with the return line 495 to allow the plunger 399 to move freely within its cooperating cylinder sleeve 398. Pressure may be applied to the plunger 399 to force it against the plunger 368 by actuating the valve 545 through the energization of a solenoid coil 552. Actuation of the valve 545 serves to connect the pressure line 493 to a line 553 for carrying the fluid pressure to the chamber 410 to actuate the plunger 399. It is apparent that pressure may be applied to the plungers 380 and 399 either individually or simultaneously by the selective operation of the valves 544 and 545. Actuation of the directional valve 543 will operate to apply pressure to both of the piston sleeves 381 and 401 simultaneously. The selective actuation of the valves 543, 544 and 545 by energization of their associated solenoid coils will therefore establish the four positions of the plunger 368 to obtain the four rotary positions of the tool change arm 75 in the manner previously described.

As previously described, the piston and cylinder mechanism 110 operates to pivot the selected tool storage socket 91 outwardly of the magazine 70 at the tool change station 88 for moving the selected tool 65 out of the magazine 70 into an operating position where the tool change arm 75 may engage it. The piston and cylinder mechanism 110 is operated by hydraulic pressure from the pressure line 492 under the control of a pair of directional valves 558 and 559. The valve 558 is normally positioned to connect the right end of the cylinder 110, as viewed in FIG. 23, to the return line 494 through a throttle valve 560 while the valve 559 is normally positioned to connect the left end of the cylinder to the return line 494 through a throttle valve 561. Energizing a solenoid coil 562 actuates the valve 558 so that it operates to direct hydraulic pressure from the pressure line 492 to a line 563 connected to the right end of the cylinder of the piston and cylinder mechanism 110. Pressure applied to the right end of the cylinder of the mechanism 110, as viewed in FIG. 23, will force the associated piston to the retracted position wherein the tool storage socket 91 will be retracted within the magazine 70.

While the fluid pressure is being supplied to the right end of the piston and cylinder mechanism 110 to effect retraction of the tool storage socket 91 the fluid pressure in the line 563 will also be supplied to the chamber 289 of the relatively short cylinder 242 via a connected line 557. The pressure applied to the chamber 289 of the cylinder 241 will force the piston 278 upwardly wherein the tool change arm 75 will be moved to its parked position, as previously described.

The valve 559 may be actuated by energizing a solenoid coil 565 for directing fluid pressure from the pressure line 492 through a line 566 to the left end of the cylinder of the mechanism 110 as viewed in FIG. 23. The hydraulic pressure applied to the left end of the cylinder of the mechanism 110 will force its associated piston in a rightward direction for effecting the pivotal movement of the selected tool storage socket 91 outwardly of the magazine to its operative position. While the fluid pressure is being supplied to the left end of the actuator 110 for pivoting the selected tool storage socket 91 outwardly of the magazine, fluid pressure will also be directed into a connected line 567 and thence to the chamber 288 of the cylinder 241. Fluid pressure supplied to the chamber 288 of the cylinder 241 will force the piston 278 downwardly wherein the tool change arm 75 will be moved from its parked position to its operating position.

When the valve 559 is actuated, the valve 558 will be deactuated and the exhaust pressure from the cylinder of the actuator 110 and from the chamber 289 of the cylinder 241 will be directed to the return line 494 through the valve 558 and the throttle valve 560 so that the rate of movement of both the socket 91 and the arm 75 will be established by the setting of the throttle valve 560. On the other hand, when the tool storage socket 91 is being pivoted inwardly into the magazine 70, and the tool change arm is being moved from its operating position to its parked position, the exhaust fluid from the actuator mechanism 110 and from the chamber 288 of the cylinder 241 will flow through the deactuated valve 559 and the throttle valve 561 so that the latter establishes the rate of the retracting movement of these members.

Thus, it is apparent that the pivotal movement of the tool storage socket 91 outwardly of the magazine and the movement of the tool change arm 75 from its parked position to its operating position is under the control of the valve 559 while the retracting movement of these members is under the control of the valve 558.

As previously mentioned, the rollers 79 associated with each of the tool grips 74 and 76 of the tool change arm 75 may be locked in tool engaging position by the application of fluid pressure to the bores 446 at the lower end of the plungers 444 therein. Fluid pressure is supplied to the bores 446 from the branch pressure line 493 under the control of a directional valve 580. The valve 580 is normally positioned to connect both bores 446 to the return line 495. The valve 580 may be actuated by energizing a solenoid coil 581 to condition the valve so that it operates to direct hydraulic pressure from the pressure line 493 to a line 582 that is connected to the port 459 in the hub 191 of the arm carrier bracket 187. Pressure applied to the pistons or plungers 444 will force the plungers outwardly of the bores 446 into forceful engagement with the roller carrying brackets 441 thereby locking the rollers in engagement with the collars of the tools 65 carried by the tool grips 74 and 76. The valve 580 is actuated at the time the tool change arm 75 is being extended because rotation of the tool change arm 75 with tools 65 in the grips 74 and 76 occurs only when it is in its extended position, and it is the rotational movement which may dislodge the tools 65 from the tool grips 74 and 76. Accordingly, the requirement to lock the rollers 79 in their normal positions exists only when the tool change arm 75 is in its extended position.

When the tools are to be withdrawn from the spindle 62 and the storage socket 91, the collet 470 must be released, as previously described. To accomplish this, the valve 509 must be actuated by energization of the associated solenoid coil 510, to condition the valve for directing fluid pressure to the chamber 472. During this interval, the solenoid 581 of the valve 580 is also energized so that the rollers 79 will be maintained locked in engagement with the collars of the tools in the tool grips 74 and 76. After the tools have been inserted into the spindle 62 and the tool storage socket 91, the solenoid 510 of the valve 509 will be deenergized to return the valve to its normal position connecting the chamber 472 to the return line 494 for locking the tool within the spindle. At this time, the solenoid 581 of the valve 580 will also be deenergized so that the valve is returned to its normal position wherein the bores 446 will be connected to the reservoir 491. With this condition obtained, the tool change arm may be rotated out of engagement with the tools in the socket and in the spindle 62 and returned to its start position. As the tool change arm is rotated to its start position, the plunger 444 of the tool change arm wil be released so that as the tool change arm rotates the rollers 79 may roll over the peripheral surface of the collars of the tools by compressing the springs 448.

The electrical control circuit for controlling the electrical components described is shown in the wiring diagram of FIG. 24. As there shown, the alternating current components are connected across a pair of alternating current power lines AC-1 and AC-2, as illustrated in FIG. 24. The electrical components are shown in the wiring diagram as connected in one of the plurality of reference lines that are connected across the power lines with each of these reference lines being identified by the numerals L1 to L52 inclusive, so that the components may be readily located in the diagram.

The power lines are energized by closing a manually operated master start switch 601 in line L3 of FIG. 24. The closing of the switch 601 operates to energize the coil of a master relay CRM which has two normally open contacts CRM-1 in line L6 and CRM-2 in line L7. With the master start switch 601 closed, a circuit is established to the coil of the relay CRM via the conductor of line L4, through a normally closed contact of an emergency stop switch 602, the conductor of line L3, through the now closed contact of the master switch 601 and the conductor of line L2, to the coil of the relay CRM and thence along the conductor of line L2, to the power line AC-2. Energization of the coil of the relay CRM operates to close the contacts CRM-1 in line L6, and CRM-2 in line L7, to connect the power lines AC-1 and AC-2 for energizing the control circuit. This is accomplished along the conductor of line L7, through the now closed contact CRM-2 to a conductor of line L8 and thence to a power line AC-3. The AC-2 power line is connected to energize a power line AC-4 by the conductor of line L5, through the now closed contact CRM-1 in line L6, and thence along the conductor of line L6 to the power line AC-4. With the relay CRM energized another contact CRM-3 in line L3 is also moved to a closed position for establishing a holding circuit around the start switch 601 so that the coil of the relay CRM will remain energized upon the release of the master switch 601. This circuit for maintaining the relay CRM energized is established along the conductor of line L4 through the normally closed contact of the stop switch 602. The flow of current continues along the line L4, to the conductor of line L3 and thence through the now closed contact CRM-1 to the line L2 to the coil of the relay CRM.

As previously mentioned, the machine may be operated entirely automatically from recorded data contained on a record such as a magnetic or punched tape 603 which is shown being processed through a reading head 604. If the machine is to be placed under the control of signals received from such recorded data, a manually operated automatic mode selector switch 606 is positioned to move its contact 607 in line L7 to a closed position for completing a circuit along the line L7 through the now closed contact CRM-2, the now closed contact 607 of the switch 606, and thence along the conductor of line L7 to the coil of an automatic relay 9CRA with the current continuing along the line L7 to the now energized power line AC-4. The closing of the contact 607 also functions to complete a circuit through a coil of an automatic relay 7CRA which is connected to be energized by the line L7. The energization of the automatic relays 7CRA and 9CRA conditions the entire control circuit for operation in response to signals received from the record. When the automatic relay 7CRA is energized, a contact 608 in line L52 is moved to a closed position so that a circuit is established from the energized power line AC-3 along the line L52 to the reading head 604. From the reading head 604 the current will flow along the conductor of line L52 and through the now closed contact 608 and continue along the conductor of line L52 to the energized power line AC-4. The energized reading head operates to read the information on the tape 603 in a well known manner. On the other hand, if the various functions of the machine are to be initiated by the manual operation of switches, the automatic mode switch 606 is allowed to remain in its open position to interrupt the circuit to the automatic relays 7CRA and 9CRA.

The electrical diagram of FIG. 24 illustrates diagrammatically the electrical control circuit for controlling the rotation of the ring 81 for locating the desired tool at the tool change station 88, and also illustrates the electrical control circuit for controlling the tool change operation. Before the ring 81 is rotated, it is necessary that the tool change arm 75 be in its initial position and retracted, that the piston and cylinder mechanism 110 be actuated so that the connecting rod 113 is retracted for effecting retraction of the tool storage socket 91 within the magazine 70, and also, that the tool change arm 75 is swung back to its inoperative or parked position.

When these three conditions are satisfied, the limit switches 179, 430, 122 and 343, shown diagrammatically in line L18 of FIG. 24, will be closed. This is apparent from the previous description, since the limit switch 179, illustrated in FIG. 2, is actuated when the quill 126 has retracted the tool change arm 75. In like manner, when the piston and cylinder mechanism 110 has been actuated to retract the piston rod 113 for pivoting the tool into the magazine 70, the limit switch 122 will be actuated. When the tool change arm 75 is moved into its parked position, the plunger 278 will be in its uppermost position wherein the limit switch 343 is actuated as previously described. Finally the limit switch 430 is actuated when the tool change arm 75 is in its start position. This is apparent from the views in FIGS. 16B to 22B, inclusive, in relation to the views of the tool change arm 75 in FIGS. 16A to 22A. When the tool change arm 75 is in the start position shown in FIG. 16A, the dog 434 is positioned to actuate the limit switch 430 as shown in FIG. 16B. When the tool change arm 75 is displaced 180° from the position shown in FIG. 16A to the position shown in FIG. 19A, the dog 435 is then positioned to again actuate the limit switch 430. Accordingly, the limit switch 430 is actuated to its closed position for either one of the start positions of the tool change arm 75.

With the four switches 179, 430, 122 and 343 thus closed, a circuit is completed through these switches as well as through a normally closed contact 611 and a normally closed contact 612 in line L18, to energize a relay 33CR. Energization of the relay 33CR closes its normally open contact 613 in line L13, and rotation of the ring 81 may be initiated. The rotation of the ring 81 is initiated by manually actuating a manual mode selector switch, generally identified by the reference numeral 615, to close its three contacts 616, 617 and 618. On the other hand, the rotation of the ring 81 is initiated automatically by the closing of a contact 621 in line L11, in response to a signal from recorded data. Assuming that the machine is being operated automatically in response to signals from recorded data, the contact 621 will be closed to complete a circuit through a normally closed contact 622 in line L10, of a deenergized relay 25CRE in line L1, which is associated with a tool selection circuit [not shown]. A tool selecting circuit suitable for selecting a desired tool is shown and described in detail in the aforementioned U.S. Patent No. 3,052,011. The circuit will continue through the closed contact 621 in line L11, and since the machine is under automatic control, contact 623 in line L11, will also be closed. The circuit then continues from the now closed contact 623 through a conductor 620 to the now closed contact 613 in line L13, and through a normally closed contact 624 in line L11, to the solenoid 534 of the valve 527. With the solenoid 534 receiving current through the circuit just described, the valve 527 will be actuated for initiating forward rotation of the ring 81, as previously described.

The signal from recorded data for initiating rotation of the ring 81 may be momentary, and in addition to energizing the solenoid 534, such closure of the contact 621 will also serve to energize a relay 30CR in line L10, to close its normally open contact 626 in line L15. Closing of the contact 626 serves to by-pass the contact 621 so that the solenoid 534 will be maintained energized despite the opening of the automatic contact 621.

Rotation of the ring 81 will continue until the desired tool arrives at the tool change station 88. When this occurs, a relay 26CRE, shown in line L1, that is associated with the tool selecting circuit [not shown] will be energized so that it operates to open its normally closed contact 624 in line L11. This interrupts the circuit to the solenoid 534 to terminate forward rotation of the ring 81. When accurate location of the desired tool at the tool change station is achieved, the limit switch 95, illustrated diagrammatically in FIG. 24 on line L17, will be actuated to complete a circuit for energizing a relay 32CR in line L17. Energization of the relay 32CR will cause the opening of its normally closed contact 628 in line L12 to interrupt the circuit to the solenoid 529 for preventing reverse rotation of the ring 81.

With the ring 81 properly indexed so that a desired tool is located at the tool change station 88, the control circuit must be conditioned to establish either a clockwise or a counterclockwise direction of rotation of the tool change arm 75 for its 180° of angular movement in interchanging the tools 65 that have been withdrawn from the spindle 62 and the magazine 70. It will be recalled from the previous description that in each alternate tool change cycle the tool change arm rotates 180° in a clockwise direction to interchange the tool while this step is completed by a counterclockwise direction of rotation for the other alternate tool change cycle. Furthermore, at the completion of each tool change cycle, the tool change arm 75 is displaced 180° from the position in which it was disposed when the tool change cycle was initiated. The condition of the limit switch 431, shown diagrammatically in line L28 of FIG. 24, will determine whether the succeeding tool change cycle requires a 180° clockwise or counterclockwise direction of rotation of the tool change arm 75 to interchange the two tools 65 carried in its grip. To this end, the limit switch 431, as shown in line L28, has a contact bar which cooperates with two contacts 631 and 632. The normal position of the contact bar of the limit switch 431 is to bridge the contact 632, and when the limit switch 431 is actuated it bridges the contact 631.

In FIG. 16B, the position of the switch actuating dog 433 is shown when the tool change arm 75 is in an initial position and the next tool interchange is to be initiated with the arm rotating 180° in a clockwise direction. On the other hand, FIG. 19B illustrates the position of the dog 433 when the tool change arm 75 is in an initial position but displaced 180° from the position depicted in FIG. 16A and the succeeding tool interchange is to be completed with a 180° counterclockwise rotation of the tool change arm 75. It will be observed from the view in FIG. 16B that the dog 433 is actuating the plunger of the limit switch 431 so that its contact bar is in engagement with the contact 631, as illustrated in FIG. 24. When the tool change arm 75 is displaced 180° from the position shown in FIG. 16A, the dog 433 will be positioned in its lowermost position, as illustrated in FIG. 19B, wherein it is out of engagement with the plunger of the limit switch 431. As a result, the limit switch 431 is deactuated and its contact bar will be in engagement with the contact 632 to produce 180° counterclockwise directional rotation of the tool change arm 75 in completing a tool interchange.

If the limit switch 431 is actuated to cause a 180° clockwise rotation of the tool change arm 75 in completing a tool interchange, a relay 36CR in line L28, will be energized. On the other hand, if the limit switch 431 is deactuated to indicate a 180° counterclockwise rotation of the tool change arm 75 to complete a tool interchange, a relay 37CR in line L29, will be energized. However, before either one of these two relays is energized to initiate a tool change cycle, it is essential that the spindle head 60 be located in its retracted position to locate the tool 65 in the spindle 62 with respect to the tool change arm 75. For this purpose, a limit switch 635, shown diagrammatically in line L28, is connected to be actuated by the spindle head 60 when the latter arrives at its retracted position. Thus, before either one of the relays 36CR or 37CR may be energized, the limit switch 635 must be actuated to its closed position to complete the circuit. Since the relay 32CR is already energized, as previously described, by actuation of the switch 95 upon the completion of the indexing of the ring 81, its normally opened contact 636 in line L28, will be closed and, assuming that a clockwise rotation of the tool change arm 75 is required to interchange the two tools 65 in the succeeding tool change cycle, a circuit will be completed to the relay 36CR through the now closed switch 635, the now closed contact 636 and the actuated limit switch 431.

Energization of the relay 36CR serves to close its normally open contact 637 in line L19, to complete a circuit for energizing a latch relay 2CRL. The current for energizing the latch relay 2CRL in line L19, flows through the four closed switches 179, 430, 122 and 343 to the normally opened contact 638 in line L20, which will be closed if the machine is in automatic operation from recorded data. The current will then flow through the now closed contact 638, a now closed contact 639 in line L19, and the now closed contact 637 to the latch relay 2CRL. However, if the machine is not under the control of recorded data, the automatic relay 9CRA will not be energized and the contact 638 will be in its normally open position. In this case the current will by-pass the open contact 638 and flow through the closed contact bar 617 of the manual mode switch 615 and thence through a normally closed contact 641 in line L19, of the deenergized automatic relay 9CRA, and the now closed contacts 639 and 637, to the relay 2CRL. The relay 2CRL is a latch relay and will not be deactuated when its coil is deenergized, but will only be deactuated when its cooperating unlatching relay 2CRU in line L22, is energized.

It will be noted that the normally open contact 639 is in the circuit to the latch relay 2CRL so that the relay 26CRE of the tool selection circuit, which indicates that the desired tool is located at the tool change station 88, must be energized to energize the latch relay 2CRL for initiating a tool change cycle. If the desired tool is already in the spindle 62, the relay 26CRE will not be energized so that its contact 639 in line L19, will remain open so that the latch relay 2CRL will not be energized and a tool change cycle will not be initiated. However, if the desired tool is in the magazine 70 but properly located at the tool change station 88, the indexing of the ring 81 will not occur by reason of the fact that the relay 25CRE will be energized and its associated contact 622 in line L10, will be opened so that a circuit cannot be established to the solenoid 534 of the valve 527 which initiates rotation of the ring 81. But in this case, the relay 26CRE will be energized and its contact 639 will be closed to permit initiation of a tool change cycle.

Energization of the latch relay 2CRL has the immediate effect of opening its normally closed contacts 611 in line L18, and 642 in line L26, to deenergize the relays 33CR and 35CR respectively. Deenergization of the relays 33CR and 35CR will serve to open their normally open contacts 643 in line L23, and 644 in line L24, so that both of the unlatching relays 2CRU and 3CRU are deenergized. When the unlatching relays 2CRU and 3CRU are energized they serve to deactuate the two latch relays 2CRL and 3CRL. The opening of the contacts 643 and 644 further serve to interrupt the circuit to the solenoid 562 of the valve 558 to insure that this valve will not be actuated so that the tool change arm 75 cannot be pivoted to its inoperative or parked position and the tool storage socket 91 cannot be retracted into the magazine 70. The energization of the latch relay 2CRL also functions to close a normally open contact [not shown] which is in the tool selection circuit to condition the circuit for a new tool selection.

Upon the arrival of the selected tool at the tool change station, the relay 25CRE is energized and it will operate to open its contact 622 in line L10, to insure that the relay 30CR and the solenoids 534 and 529 will not be energized so that rotation of the ring 81 cannot occur.

With the relay 25CRE energized, the solenoid 565 will be energized to actuate the valve 559 for operating the piston and cylinder mechanism 110 to swing the tool storage socket at the tool change station outwardly of the magazine 70 and also to pivot the tool change arm 75 into its operative position. This circuit is completed through the actuated limit switch 635 in line L28, the now closed contact 636 of the energized relay 32CR, to a conductor of line L29, to the now closed contact 646 in line L29, of the relay 25CRE. From the contact 646 the circuit continues through the contact bar 618 in line L30, of the manual mode selector switch 615 which will be closed if the machine is under manual control. However, if the machine is under automatic control a contact 647 in line L31, of the automatic relay 9CRA will be closed and the current will flow through it and through a conductor 648 and thence through the now closed contact 649 in line L30, of the energized latch relay 2CRL and a normally closed contact 651 of the deener- gized and deactuated latch relay 3CRL to the solenoid 565 of the valve 559.

Energization of the solenoid 565, of course, actuates the valve 559 to pivot the tool change arm 75 to its operative position and also to pivot the tool storage socket 91 at the tool change station 88 outwardly of the magazine 70 so that the selected tool 65 is available to the tool change arm. As this occurs, the coding on the tool 65 moves out of engagement with the tool reading head 99 so that the tool selection circuit [not shown] effects the deenergization of the relay 26CRE. Deenergization of the relay 26CRE operates to maintain the electrical identification of the tool being moved to the spindle 62 in the circuit until the next tool change cycle takes place. Deenergization of the relay 26CRE also operates to open its normally open contact 639 in line L19, to deenergize the relay 2CRL. However, the relay 2CRL is a latch relay and deenergization of its coil will not deactuate the relay, as this will not occur until the unlatching relay 2CRU is energized.

After the tool change arm 75 has been pivoted to its operative position and the tool storage socket 91 has been pivoted 90° outwardly of the magazine by the piston and cylinder mechanism 110, the limit switch 121 in line L31, will be actuated to a closed condition for completing a circuit to a relay 38CR in line L33. The current to the relay 38CR will flow through the now closed contact of the limit switch 635 in line L28, to the now closed contact 636 of the energized relay 32CR. From the closed contact 636 the current will flow through the conductor of line L29, and the now closed contact 646 of the energized relay 25CRE in line L29, and thence to the now closed contact 618 of the manual mode selector switch 615 which contact will be closed if the machine is being operated manually. However, if the machine is under control of recorded data, the manual mode selector switch 615 will be positioned so that the contact 618 thereof is open so that the current flowing from the closed contact 646 in line L29, will flow through the closed contact 647 of the automatic relay 9CRA, the contact appearing in line L31. The current will continue on through a conductor 648 to the now closed contact 649 of the relay 2CRL. The current will continue through a normally closed contact 651 of the deactuated latch relay 3CRL and then by means of a conductor 652 will flow to the now closed limit switch 121. From the closed contact of the actuated limit switch 121 the current will flow to a now closed contact of the limit switch 344, which has been actuated by the action of the plunger 278 of the relatively short cylinder 242 being moved to its lowermost position for pivoting the carrier 175 to move the arm 75 into its initial position. From the closed contact of the actuated limit switch 344 the current will flow through the coil of the relay 38CR in line L33, to energize the relay.

Energization of the relay 38CR will serve to close its normally open contact 656 in line L35. Prior to the tool change being effected, the spindle 62 must be locked to prevent its rotation. When this is accomplished a relay [not shown] is energized to close a normally opened contact 657 in line L35. With the contact 657 of a spindle lock relay [not shown] closed and the contact 656 of the energized relay 38CR closed, the cycle of operation of the tool change arm 75 will be initiated.

The first step in the cycle is to rotate the tool change arm 75 in a clockwise direction from the initial position as shown in FIG. 16A, to the position illustrated in FIG. 17A wherein the tool grips 74 and 76 engage tools in the tool change station 88 and in the spindle 62, respectively. In order to accomplish this rotational movement, it is necessary to direct fluid pressure to both of the piston sleeves 381 and 401 and to the lower plunger 399 of the hydraulic actuating mechanisms 370 and 371 as indicated by the arrows in FIG. 17 requiring the energization of solenoids 549 and 552 in lines L38 and L40, respectively. Since the initial rotary movement of the tool change arm 75 to the position illustrated in FIG. 17A occurs when the tool change arm 75 is in a retracted position, the limit switch 180 is deactuated and its contact bar is in engagement with a cooperating contact 658, as shown in line L40 in FIG. 24. In view of the fact that the tool change cycle requires a 180° clockwise direction of rotation of the arm 75 to interchange the tools the relay 36CR in line L28, is energized so that its normally opened contact 661 in line L40, is closed. A circuit to the solenoid 552 of the valve 545 is therefore completed through the now closed contacts 657 and 656 in line L35 through a common conductor 662 to the switch 180 in line L40. From the switch 180, the current flows through its contact 658 to the now closed contact 661 and the now closed contact 663 of the latch relay 2CRL to the solenoid 552. At the same time, current flowing through the closed contact 661 in line L40, flows into a conductor 664 to a normally closed contact 666 of the deenergized relay 37CR and thence to a now closed contact 667 in line L38, of the relay 2CRL to the solenoid 549 of the valve 543. The energization of the solenoid 549 of the valve 543 serves to actuate the valve for directing hydraulic pressure to both piston sleeves 381 and 401 of the hydraulic actuating mechanisms 370 and 371. The energization of the solenoid 552 of the valve 545 functions to actuate the valve to direct hydraulic pressure to the lower plunger 399. This combination of hydraulic pressure in the hydraulic actuating mechanisms 370 and 371 functions to shift the plunger 368 to cause a clockwise rotational movement of the tool change arm 75 from its start position illustrated in FIG. 16A, to the position illustrated in FIG. 17A, and the tool grips 74 and 76 will then engage the tool 65 at the tool change station 88 and in the spindle 62.

Before the tool 65 in the spindle 62 can be withdrawn therefrom, it is necessary to release the collet 470, as previously described. This is accomplished by energizing the solenoid 510 to actuate the valve 509 for directing hydraulic pressure to the cylinder 473 to compress the spring 468 and shift the bar 467 in a forward direction. The solenoid 510, shown in line L46 in FIG. 24, may be energized through a normally closed contact 668 or through the normally open limit switch 432 and the normally closed contact 669 in line L47. Since the tool change arm 75 is still in its retracted position, the limit switch 179 in line L18, is actuated to complete a circuit to the relay 34CR in line L25. The normally closed contact 668 in line L45, of the relay 34CR is therefore open so that a circuit cannot be completed through it to the solenoid 510. Furthermore, when the tool change arm 75 was in its start position, neither of the dogs 435 nor 436 were positioned to actuate the limit switch 432 so that the limit switch is released to its open position as shown in line L47. Thus, a circuit could not be completed through it to the solenoid 510. However, when the tool change arm 75 arrived at the position shown in FIG. 17A, the dog 435 is positioned by movement of the plunger 368 to the position shown in FIG. 17B, so that the dog 435 moves into engagement with the actuating plunger of the limit switch 432 to actuate the limit switch 432 to its closed position. This completes the circuit to the solenoid 510 through the now closed contacts 657 and 656 in line L35, and through the common conductor 662 to the now closed limit switch 432. From the switch 432 the current will flow through the normally closed contact 669 in line L47 of the relay 35CR and thence to the solenoid 510 in line L46. Upon the energization of the solenoid 510 the valve 509 is actuated to release the collet 470 to permit the withdrawal and insertion of a tool 65 ino the spindle 62.

With the collet 470 released, the next step in the cycle is to extend the tool change arm 75 for the purpose of withdrawing the two tools 65 from the spindle 62 and the tool storage socket 91. This is accomplished by energizing the solenoid 517 to actuate the valve 515 for directing hydraulic pressure to the chamber 171 to actuate the quill 126 to move the tool change arm 75 to its extended position. The releasing of the collet 470 will cause a forward movement of the piston 469 and thereby the rod 476 which moves the dog 477 out of engagement with the actuating plunger of the limit switch 475 to deactuate the limit switch. As shown in lines L48 and L51, the switch 475 is provided with a normally closed contact bar 676 and a normally open contact bar 677 so that when the switch is deactuated by the releasing of the collet 470, the contact bar 676 will engage a cooperating contact 678 to complete the circuit to the solenoid 517. The current to the solenoid 517 flows through the now closed contacts 657 and 656 in line L35, through the common conductor 662 and the now closed limit switch 432 in line L47, into a conductor 679. From the conductor 679 the current will continue and flow through the closed contact bar 676 to the contact 678 and thence through a normally closed contact 681 of the relay 35CR in line L48, to the solenoid 517 to energize it. Energization of the solenoid 517 effects the actuation of the quill 126 for moving the tool change arm 75 to its extended position to withdraw the tools from the spindle 62 and the tool storage socket 91.

As previously described, when the movement of the tool change arm 75 to its extended position is initiated, the tool grips 74 and 76 must be locked prior to the withdrawal of the tools 65 from the spindle 62 and tool storage socket 91. Therefore, the valve 580 must be actuated so that fluid pressure is supplied to the bores 446 for actuating the plungers 444 to lock the rollers 79 in engagement with the tools 65 within the grips 74 and 76. This is accomplished by energizing the solenoid 581. As previously mentioned, when the quill 126 is in its retracted position, the limit switch 179 is actuated to complete a circuit to the relay 34CR in line L25. The energized relay 34CR operates to open its normally closed contact 690 in line L49 to interrupt the circuit to the solenoid 581. However, as the quill 126 starts to move axially to extend the tool change arm 75, the limit switch 179 is released so that the circuit to the relay 34CR is interrupted to deenergize the relay. With the relay 34CR deenergized, its contact 690 in line L49, is closed to complete the circuit to the solenoid 581. The current to the solenoid 581 flows into line L43, through a conductor 682 and the line L49 to the now closed contact 690 in line L49, to the solenoid 581 to energize it. Energization of the solenoid 581 actuates the valve 580 for directing hydraulic pressure to the bores 444 for locking the rollers 79 of the tool grips 74 and 76, prior to the withdrawal of the tools from the spindle and tool storage socket. Thus, as the tool change arm 75 is being extended, the tools 65 in the grips 74 and 76 are locked therein so accidental displacement of the tools from the grips cannot occur.

With the tool change arm 75 extended so that the tools 65 are extracted from the spindle 62 and the tool storage socket 91, the next step in the cycle is to revolve the tool change arm 75 in a clockwise direction through an angle of 180° from the position shown in FIG. 17A to the position shown in FIG. 18A so that the positions of the two tools 65 in the tool grips 74 and 76 are interchanged. To effect this rotation it is necessary to direct hydraulic pressure into the port 387 to actuate the plunger 380 while the other three ports 384, 406 and 408 in the hydraulic actuating mechanisms 370 and 371 are to be connected to exhaust. This is accomplished by energizing the solenoid 551 to actuate the valve 544 while the solenoids 549 and 552 are denergized. When the tool change arm 75 was fully extended by energization of the solenoid 517, the limit switch 180 associated with the quill 126 was actuated to move its contact bar from the position illustrated diagrammatically in line L40, into engagement with the contact 684; and this actuation of the switch 180 serves to interrupt the circuit to solenoids 549 and 552.

Furthermore, when movement was initiated to extend the tool change arm 75, the limit switch 179 associated with the quill 126, was deactuated since it is only actuated when the tool change arm 75 is in its fully retracted position. The opening of the switch 179, shown diagrammatically in line L18 of FIG. 24, serves to interrupt the circuit to the relay 34CR to close its normally closed contact 668 in line L46. As a result a circuit is completed from the energized conductor 662, through line L46, and through the now closed contact 668 of the deenergized relay 34CR to the solenoid 510, to maintain the solenoid 510 energized. This holding circuit is established so that the collet 470 will be maintained in its released condition for subsequently receiving the cutting tool.

When the limit switch 180 was actuated by movement of the tool change arm 75 to its extended position as previously mentioned, its contact bar in line L40 was moved out of engagement with the contact 658 and into engagement with its associated contact 684 in line L39. This served to interrupt the circuit to the solenoids 549 and 552 to deenergize them, but completed a circuit to energize the solenoid 551 for actuating the valve 544 to direct hydraulic pressure to the plunger 380 of the hydraulic actuating mechanism 370. Current for energizing the solenoid 551 flows through the now closed contacts 657 and 656 in line L35, thence through the common conductor 662 and the contact bar of the limit switch 180 to the contact 684. From the contact 684 the current flows to a conductor 686 and thence to a conductor 687. From the conductor 687 the current will flow into a conductor 688 in line L41. From the conductor 688 the current continues to a now closed contact 689 in line L42 of the energized relay 2CRL, from whence it flows along the line L42 to the solenoid 551 to energize it. With the valve 544 actuated by the energization of the solenoid 551, hydraulic pressure is directed to the port 387 for actuating the plunger 380 while the other ports 384, 406 and 408 of the hydraulic actuating mechanisms 370 and 371 are connected to exhaust by reason of the deenergization of the solenoids 549 and 552.

With hydraulic pressure supplied to actuate the plunger 380 downwardly, the plunger 368 will move downwardly from the position illustrated in FIG. 17, to its lowermost position where its notch 416 engages the detent mechanism 420, as shown in FIG. 18, to effect a 180° clockwise rotation of the tool change arm 75 to the position shown in FIG. 18A. The dogs 433 to 436 inclusive, will move the plunger 368 to the position shown in FIG. 18B.

As the dog 433 moves from the position shown in FIG. 17B, to the position illustrated in FIG. 18B, it moves out of engagement with the actuating plunger of the limit switch 431. This caused the contact bar of the limit switch 431 to drop out of engagement with the contact 631 in line L28, and into engagement with its associated contact 632 in line L29. Such deactuation of the switch 431 operates to deenergize the relay 36CR and energize the relay 37CR in line L29. The energization of the relay 37CR functions to close its normally open contact 691 in line L27, to complete a circuit through it and the normally closed contact 692 of the latch relay 3CRL to energize the relay 35CR. The energization of the relay 35CR serves to open its normally closed contact 681 in line L48, to interrupt the circuit of the solenoid 517 to deactuate the valve 515 to terminate the flow of hydraulic pressure for extending the tool change arm 75. However, in order to retract the arm, the solenoid 516 must be energized to actuate the valve 514 for directing hydraulic pressure to the chamber 173 associated with the quill 126 to retract the tool change arm 75.

When the plunger 368 arrives at the position shown in FIG. 18, upon 180° angular displacement of tool change arm 75 in a clockwise direction, the dog 436 is moved into position to close the limit switch 432, as illustrated in FIG. 18B. A circuit is therefore completed to the solenoid 516 through the now closed contacts 657 and 656 in line L35, through the conductor 662 and the closed contact bar of the actuated limit switch 432 to the conductor 679. From the conductor 679, the flow of current continues through the closed contact bar 676 of the switch 475, to a conductor 693 from whence it will flow through the now closed contact 694 in line L50, and a normally closed contact 695 to the solenoid 516. Energization of solenoid 516 will serve to actuate the valve 514 for directing hydraulic pressure to the chamber 173 associated with the quill 126 for retracting the tool change arm 75. As the tool change arm 75 is retracted, it inserts the new tool into the spindle 62 and the previously used tool into the storage socket 91 at the tool change station 88. Under these conditions the collet 470 is released to receive the cutting tool. This is true because the solenoid 510 is maintained energized through the holding circuit established along the line L46 and through the closed contact 668 of deenergized relay 34CR, previously described. When the tool change arm 75 arrives at its fully retracted position, the limit switch 179 will be actuated to again complete the circuit to the relay 34CR in line L25. Energization of the relay 34CR functions to open its normally closed contact 695 in line L50, to interrupt the circuit to the solenoid 516.

As the retraction of the tool change arm 75 begins, the limit switch 180, through which the solenoid 551 was energized, is deactuated. However, it is necessary that the solenoid 551 be maintained energized while the retraction of the tool change arm 75 is taking place to hold the tool change arm 75 in its rotary position. Therefore, when the relay 35CR was energized it closed its normally open contact 711 in line L35, to establish a parallel circuit for retaining the solenoid 551 energized. The flow of current by-passes the switch 180 and flows through the now closed contacts 657, 656 and 711 in line L35, and thence through the conductor 687, the conductor 688 in line L41, and the now closed contact 689 in line L42, to the solenoid 551. The tool change arm 75 is therefore retained in its rotary position when it is being retracted to insert a new tool 65 in the spindle 62 and the previously used tool 65 in the tool storage socket 91 at the tool change station 88.

As previously mentioned, when the tool change arm 75 is fully retracted, the limit switch 179 is actuated to energize the relay 34CR. The energization of the relay 34CR operates to open its normally closed contact 668 in line L46 to interrupt the holding circuit to the solenoid 510 for terminating the flow of hydraulic pressure to the chamber 472 of the cylinder 473 and connects the chamber to exhaust. The spring 468 then operates to retract the draw bar 467 to actuate the collet 470 for locking the new tool in the spindle 62. The actuation of the collet 470 causes the previously described rearward movement of the rod 476 to actuate the limit switch 475. Actuation of the limit switch 475 operates to close its normally open contact bar 677 in line L51 and open its normally closed contact bar 676 in line L48. The opening of the contact bar 676 would interrupt the circuit to the solenoid 516 but its associated contact bar 677 closes with the actuation of the switch 475, to complete a parallel circuit for maintaining the solenoid 516 energized. This circuit is established through the now closed contact bar 677 and the now closed contact 712 of the energized relay 34CR in line L51, to the solenoid 516 for the purpose of maintaining hydraulic pressure to the chamber 173 for retaining the tool change arm 75 in its retracted position.

The energization of the relay 34CR to effect a release of the collet 470, also, opens its contact 690 in line L49 to interrupt the circuit to the solenoid 581 to deenergize it. Deenergization of the solenoid 581 will effect a return of the valve 580 to its normal position, as shown in FIG. 23, to connect the tool arm plunger bores 446 to the reservoir thereby unlocking the rollers 79 of the arm 75. With the tool grips 74 and 76 unlocked, the tool change arm 75 may be rotated out of engagement with the interchanged tools and back to its start position, as shown in FIG. 19A.

With the two tools 65 interchanged and with the tool grips 74 and 76 unlocked, the next step in the cycle is to rotate the tool change arm 75 in a counterclockwise direction from the position shown in FIG. 18A to the start position depicted in FIG. 19A. In order to accomplish this, it is necessary, as indicated in FIG. 19, to direct hydraulic pressure to the plunger 380 and to the two piston sleeves 381 and 401, while the port 408, which is in communication with the cylinder containing the plunger 399, is connected to exhaust. These hydraulic connections are obtained by energizing the solenoids 549 and 551, the latter being already energized from the preceding steps in the cycle. The solenoid 552 will remain deenergized to connect the port 408, which is in communication with the plunger 399, to exhaust.

As previously mentioned, the relay 34CR became energized when the tool change arm 75 was fully retracted and actuated the limit switch 179. The relay 37CR likewise was energized when the limit switch 431 was deactuated by the dog 433 moving out of engagement with the actuating plunger of the limit switch 431 as depicted in FIG. 19B. With the relays 34CR and 37CR energized, their normally open contacts 716 and 717 in line L39 are closed to complete a circuit to the solenoid 549. The current for energizing the solenoid 549 flows through the now closed contacts 657 and 656 in line L35, to a conductor 718. The current will continue on and flow through the conductor 718, the now closed contacts 716 and 717 in line L39, and through the now closed contact 667 in line L38, to the solenoid 549 for energizing it. With both solenoids 549 and 551 energized, the valves 543 and 544 are actuated to direct the hydraulic pressure to the sleeves 381 and 401 as well as to the plunger 380 to cause a shifting of the plunger 368 upwardly to move its notch 417 into engagement with the detent mechanism 420, as illustrated in FIG. 19. This upward movement of the plunger 368 functions to cause the counterclockwise rotation of the tool change arm 75 to its vertical position, as illustrated in FIG. 19A. At this time, it will be noted, from FIG. 19A, that the tool change arm is displaced 180° from the position it occupied as shown in FIG. 16A, from which it initiated a tool change cycle. As a consequence, the succeeding tool change cycle must include a 180° counterclockwise rotation of the tool change arm 75 for interchanging the two tools 65 in its grips 74 and 76. On the other hand, in the cycle just described, this step was completed by a 180° clockwise rotation of the tool change arm 75.

As the plunger 368 moves upwardly the dogs thereon move with it so that the dog 435 is positioned to engage the actuating plunger of the limit switch 430 as illustrated in FIG. 19B, to close the switch. This completes a circuit through the closed limit switch 179, the closed limit switch 430 to a conductor 719. The current will continue through line L23, to the line L24, through the now closed contact 644 of previously energized relay 35CR and will flow therethrough to energize the solenoid 562. It will be recalled that the relay 35CR was energized at the time the tool change arm 75 was rotated in a 180° of directional movement to interchange the position of the two tools. At that time the limit switch 431 was released to effect energization of the relay 37CR and through it energization of the relay 35CR. Energization of the solenoid 562 actuates the valve 558 to direct hydraulic pressure to the chamber 289 of the relatively short cylinder 242 for pivoting the tool change arm 75 from its operating position to its parked position. In addition, actuation of the valve 558 serves to direct fluid pressure to the right end of the cylinder 110, as viewed in FIG. 23, to effect retraction of the tool storage socket 91 into the magazine 70. At the same time, the current flows from the now closed contact 644 in line L24, into a conductor 720 from whence it will flow to both unlatching relays 2CRU in line L22 and 3CRU in line L23. However, since only the latch relay 2CRL was actuated, the energization of its cooperating unlatching relay 2CRU will serve to release the contacts of the latch relay 2CRL to their normal positions.

It will be observed that when the tool change cycle was initiated from the position of the tool change arm 75 as illustrated in FIG. 16A, the dog 433 was positioned to actuate the limit switch 431. Since the switch 431 was actuated, its contact bar engaged the contact 631 to complete a circuit for energizing the relay 36CR. The energized relay 36CR operated to close its normally open contact 637 in line L19, to energize the latch relay 2CRL. With the latch relay 2CRL energized, the tool change cycle included a 180° clockwise rotation of the tool change arm 75 from the position shown in FIG. 17A, to the position depicted in FIG. 18A, for interchanging the position of the two tools 65 in the grips 74 and 76.

Upon the completion of the cycle, it will be observed that the dog 433 is located so that it does not engage the actuating plunger of the limit switch 431. Therefore, the contact bar of the limit switch 431 is in engagement with the contact 632 to complete the circuit to the relay 37CR instead of the relay 36CR when the succeeding tool change cycle is initiated. With the relay 37CR energized, its normally open contact 721 in line L21, is closed to complete a circuit for energizing the latch relay 3CRL instead of the latch relay 2CRL. With the latch relay 3CRL energized the solenoid 551 will be energized rather than the two solenoids 549 and 552 and the hydraulic pressure will be directed to the plunger 380 only. As a result, the plunger 368 will be moved to its lowermost position to bring its notch 416 into engagement with the detent mechanism 420 and such movement of the plunger 368 will produce a rotational movement of the tool change arm 75 in a clockwise direction to the position shown in FIG. 20A. The succeeding 180° of rotational movement of the tool change arm 75 however will occur in a counterclockwise direction rather than in a clockwise direction by the energization of the solenoids 549 and 552. The electrical control circuit will then operate in a manner similar to its operation for the first described tool change cycle to complete the second tool change cycle. Upon its completion, the tool change arm 75 will be in a start position illustrated in FIG. 22A, displaced through an angle of 180° from its start position, illustrated in FIG. 19A and identical to its original position as shown in FIG. 16A.

In FIG. 24 contacts associated with the various relays for effecting the operation of the control circuit to complete a second tool change cycle are shown. However, it is not believed to be necessary to describe the operation of control circuit in effecting the second tool change cycle as it will operate in a manner similar to its operation for the first described tool change cycle.

From the foregoing detailed description of the illustrative embodiment set forth herein to exemplify the present invention, it will be apparent that there has been provided an improved machine tool incorporating an improved tool change mechanism and having a single rotary spindle as well as a tool storage magazine which carries a supply of tools in a minimum of space with the improved tool changer operating to replace the tool in the spindle with a new tool removed from the storage magazine in a minimum period of time.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

The principles of this invention having now been fully explained in connection with the foregoing description, I hereby claim as my invention:

1. In a machine tool having a rotary spindle that receives tools for performing work operations;

a frame;

tool storage means mounted on said frame and removably carrying a plurality of tools for use in said spindle;

a carrier mounted on said frame for pivotal movement about an axis that is parallel to the axis of rotation of said spindle and for translational movement in a path parallel to the axis of said spindle;

a tool change arm rotatably supported by said carrier for translational movement therewith and to be shifted by the pivotal movement of said carrier between a parked position and an operating position with the combined sequential rotary and translational movements of said tool change arm while in the operating position serving to transfer tools between said spindle and said storage means to effect an interchange of tools with said spindle;

means connected to actuate said carrier and said tool change arm in their movements;

a transmission carried by said frame for axial movement to effect the translational movement of said carrier, said transmission including a first drive means to effect the pivotal movement of said carrier and a second drive means coaxial with said first drive means and connected to drive said tool change arm in its rotational movement;

a power unit carried by said transmission to move with it, said power unit comprising a first actuating means coupled to actuate said first drive means for pivoting said carrier, and a second actuating means connected to actuate said second drive means for effecting the rotational movement of said tool change arm; and, a third actuating means connected to actuate said transmission axially for effecting the translational movement of said carrier and its associated tool change arm.

2. In a machine tool having an operating station that receives tools for performing work operations;

a frame;

tool storage means mounted on said frame and removably carrying a plurality of tools for use in the operating station;

a carrier mounted on said frame for pivotal movement;

a tool change arm rotatably supported by said carrier for rotation about an axis that is parallel to the pivotal axis of said carrier, said tool change arm being shifted by the pivotal movement of said carrier between a parked position and an operating position with the rotary movement of said tool change arm while in the operating position serving to transfer tools between the operating station and said storage means to effect a tool change at the operating station;

a source of power;

a first shaft connected to be rotated by said source of power;

a second shaft connected for rotation with said tool change arm; and, a drive chain drivingly interconnecting said first and second shafts to transmit the power from said first shaft to said second shaft for rotating said tool change arm in a tool change operation.

References Cited

UNITED STATES PATENTS 3,052,011   9/1962   Brainard _____ 29—26

FOREIGN PATENTS 1,236,668   6/1960   France.

RICHARD H. EANES, JR., *Primary Examiner.*

WHITMORE A. WILTZ, *Examiner.*